(12) United States Patent
Okamoto et al.

(10) Patent No.: US 7,058,653 B2
(45) Date of Patent: Jun. 6, 2006

(54) TREE SYSTEM DIAGRAM OUTPUT METHOD, COMPUTER PROGRAM AND RECORDING MEDIUM

(75) Inventors: Hiroyuki Okamoto, Kanagawa (JP); Yasushi Nakazato, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 570 days.

(21) Appl. No.: 10/238,884

(22) Filed: Sep. 11, 2002

(65) Prior Publication Data

US 2003/0058706 A1    Mar. 27, 2003

(30) Foreign Application Priority Data

Sep. 17, 2001  (JP) ............................. 2001-282410
Sep. 17, 2001  (JP) ............................. 2001-282411
Sep. 17, 2001  (JP) ............................. 2001-282412

(51) Int. Cl.
    *G06F 17/30*    (2006.01)
(52) U.S. Cl. ..................... 707/102; 707/100; 707/103; 707/101
(58) Field of Classification Search ................ 707/100, 707/102, 101, 103; 715/822, 504, 764, 770, 715/503
See application file for complete search history.

(56) References Cited

U.S. PATENT DOCUMENTS

| | | | |
|---|---|---|---|
| 5,819,256 A * | 10/1998 | Ozbutun et al. ............... | 707/2 |
| 6,466,956 B1 * | 10/2002 | Cho et al. .................... | 715/531 |
| 6,765,612 B1 * | 7/2004 | Anderson et al. ........ | 348/231.2 |
| 2002/0036662 A1 * | 3/2002 | Gauthier et al. ............ | 345/835 |

OTHER PUBLICATIONS

Microsoft@Excel 2000, 1985-1999 Microsoft Corporation, p. 1-4.*

* cited by examiner

*Primary Examiner*—Cam-Y Truong
(74) *Attorney, Agent, or Firm*—Morrison & Foerster LLP

(57) ABSTRACT

A tree system diagram output method of correlating a plurality of objects and outputting the plurality of objects as a tree system diagram includes the steps of: (a) storing, in a first storing part, an identifier specific to each of the plurality of objects written on a first worksheet; (b) selecting at least one object among the plurality of objects written on the first worksheet; (c) pasting the object selected in the step (b) to a second worksheet; and (d) changing the identifier of the object to be pasted in the step (c) to a second identifier.

3 Claims, 23 Drawing Sheets

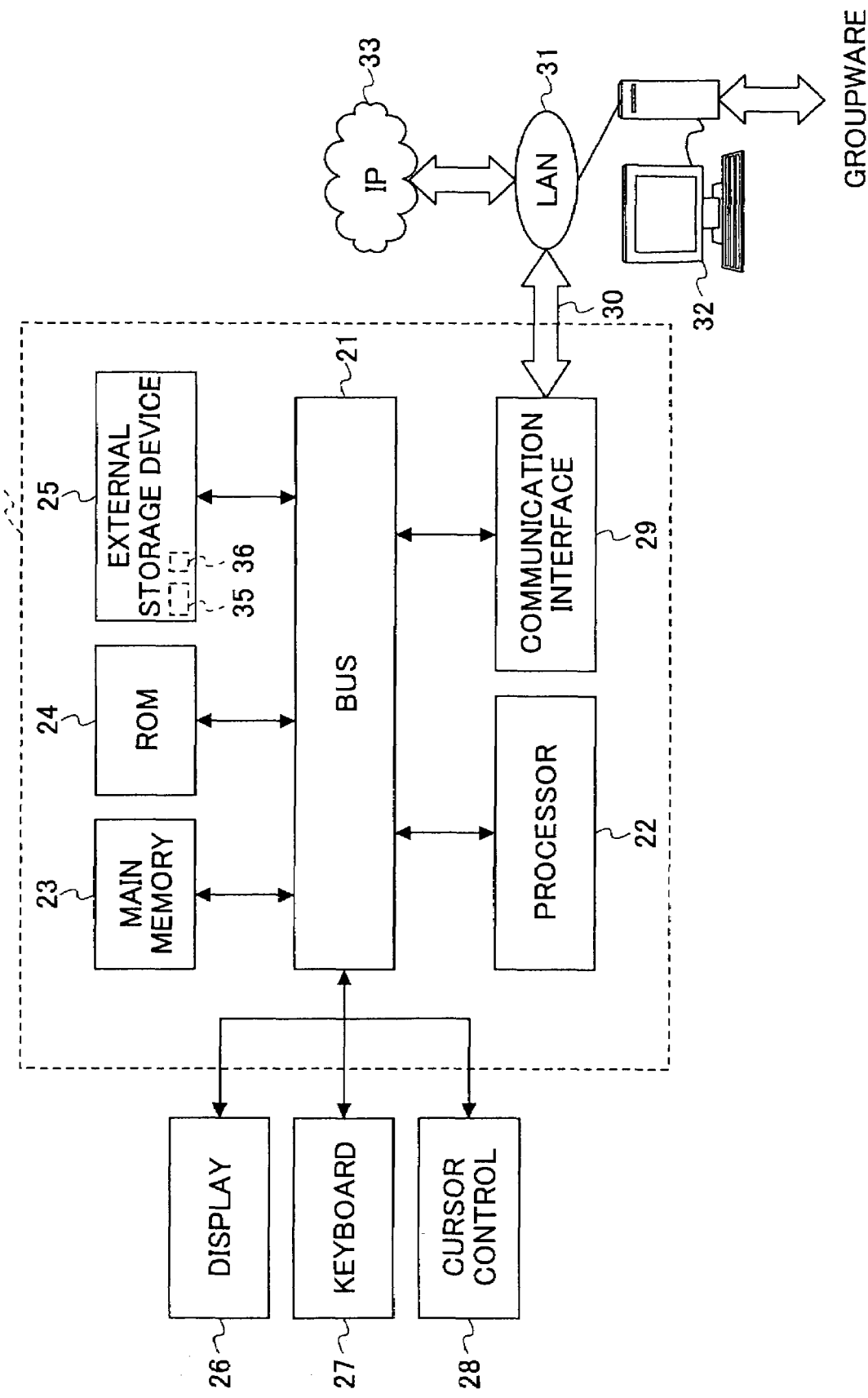

FIG.2

| IMPORTANT TECHNICAL PROBLEM | ACHIEVING MEANS | INDIVIDUAL TECHNICAL PROBLEM | ACHIEVING MEANS |
|---|---|---|---|
| PROBLEM A: 0001 | ACHIEVING MEANS A-1: 0002 | PROBLEM B: 0004 | ACHIEVING MEANS B-1: 0012 |
| | | | ACHIEVING MEANS B-2: 0013 |
| | | PROBLEM C: 0005 | ACHIEVING MEANS C-1: 0014 |
| | ACHIEVING MEANS A-2: 0003 | PROBLEM D: 0006 | ACHIEVING MEANS D-1: 0015 |
| | | PROBLEM F: 0010 | ACHIEVING MEANS F-1: 0016 |
| | ACHIEVING MEANS A-3: 0007 | PROBLEM C: 0008 | ACHIEVING MEANS C-1: 0017 |
| | | PROBLEM E: 0009 | ACHIEVING MEANS E-1: 0018 |
| | | | ACHIEVING MEANS E-2: 0021 |
| | | PROBLEM D: 0011 | ACHIEVING MEANS D-1: 0019 |
| | | | ACHIEVING MEANS D-2: 0020 |

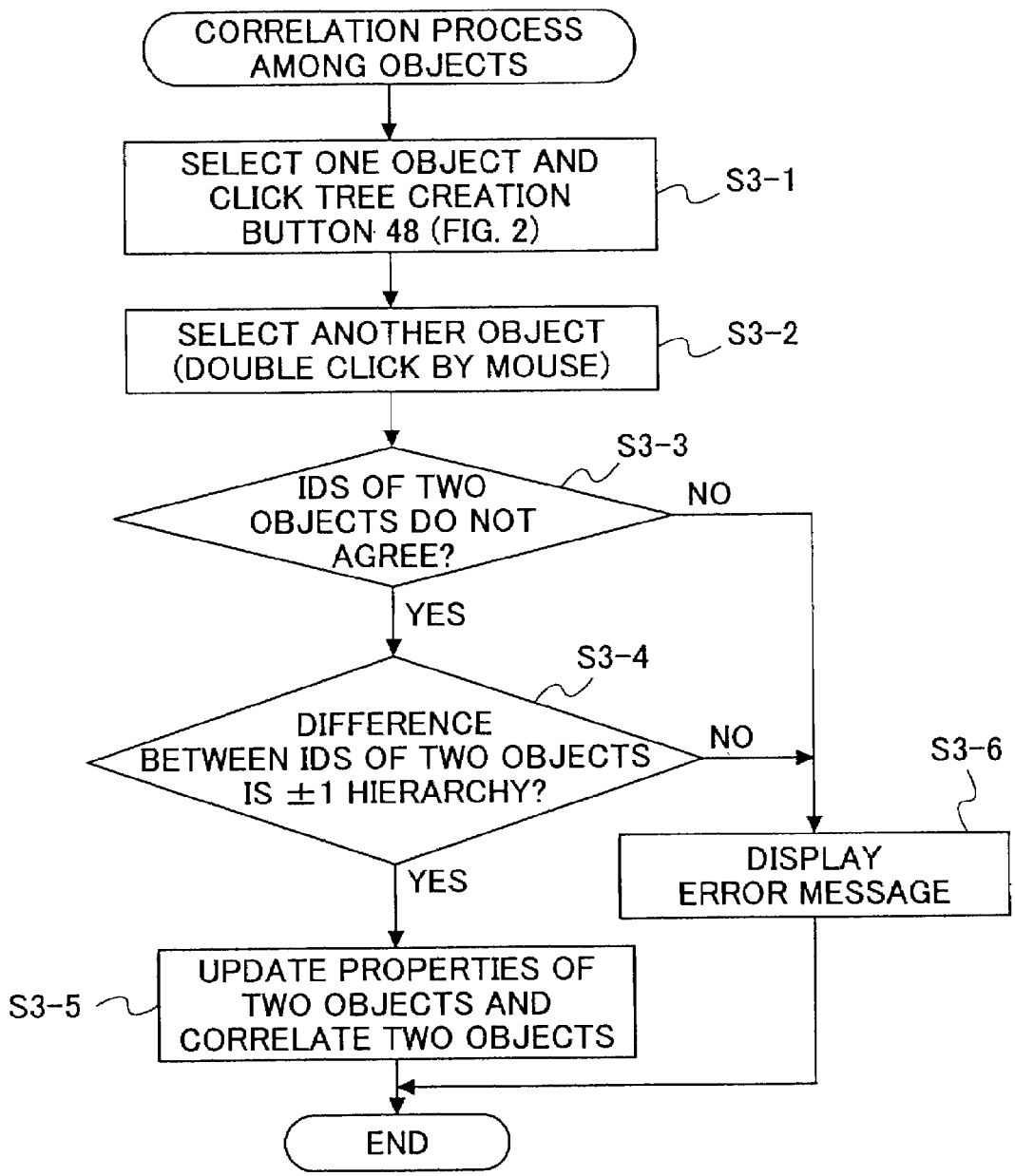

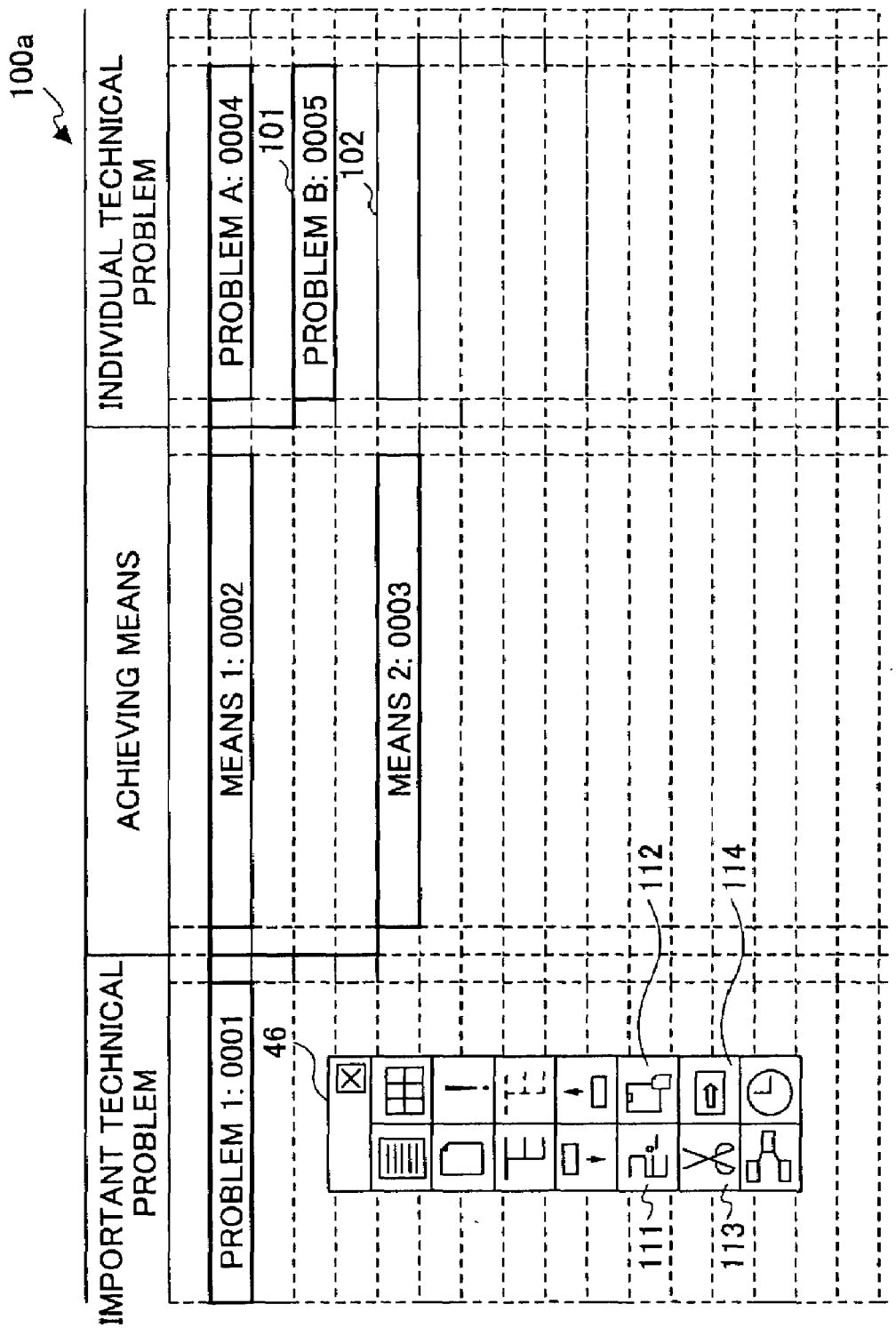

FIG.9B

| IMPORTANT TECHNICAL PROBLEM | ACHIEVING MEANS | INDIVIDUAL TECHNICAL PROBLEM |
|---|---|---|
| PROBLEM 1: 0001 | MEANS 1: 0002 | PROBLEM A: 0004 |
| | | PROBLEM B: 0005 |
| | MEANS 2: 0003 | PROBLEM B: 0006 |

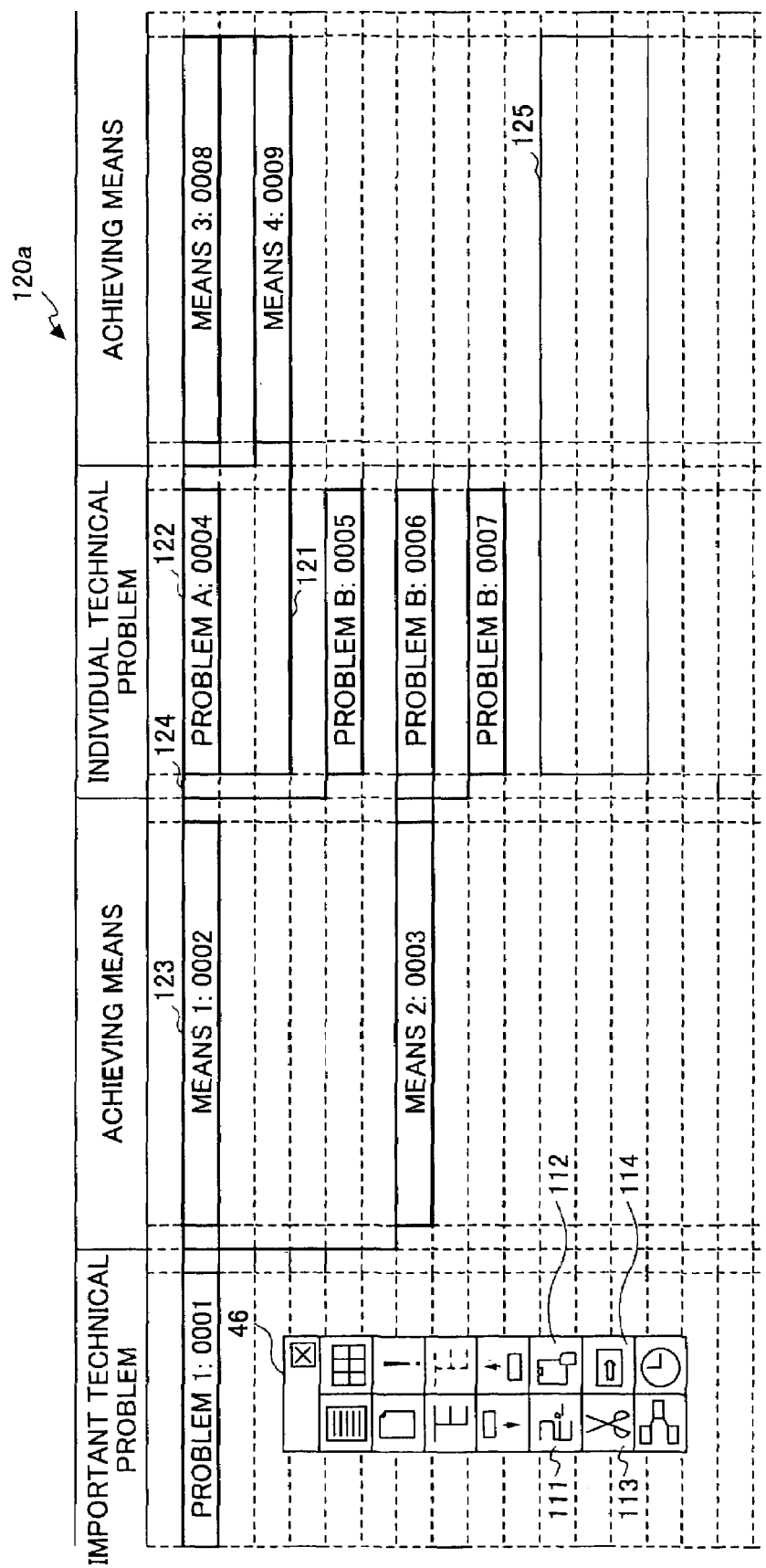

FIG.11B

| IMPORTANT TECHNICAL PROBLEM | ACHIEVING MEANS | INDIVIDUAL TECHNICAL PROBLEM | ACHIEVING MEANS |
|---|---|---|---|
| PROBLEM 1: 0001 | MEANS 1: 0002 | | |
| | MEANS 2: 0003 | PROBLEM B: 0005 | |
| | | PROBLEM B: 0006 | |
| | | PROBLEM B: 0007 | |
| | | PROBLEM A: 0004 | MEANS 3: 0008 |
| | | | MEANS 4: 0009 |

SEARCH KEYWORD: PROBLEM B    SEARCH RESULT

| IMPORTANT TECHNICAL PROBLEM | ACHIEVING MEANS | INDIVIDUAL TECHNICAL PROBLEM |
|---|---|---|
| PROBLEM 1: 0001 | MEANS 1: 0002 | PROBLEM B1: 0005 |
| PROBLEM 1: 0001 | MEANS 2: 0003 | PROBLEM B2: 0006 |

FIG.16

| | A | B | C | D | E | F | G | H |
|---|---|---|---|---|---|---|---|---|
| 1 | ADOPTION | HIT ITEM | ID | COLUMN | UPPER ID | NUMBER OF LOWER IDS | LOWER ID 1 | LOWER ID 2 |
| 2 | 1 | PROBLEM B1 | 5 | 7 | 2 | 0 | | |
| 3 | 1 | PROBLEM B2 | 6 | 7 | 3 | 0 | | |
| 4 | | | | | | | | |
| 5 | | | | | | | | |

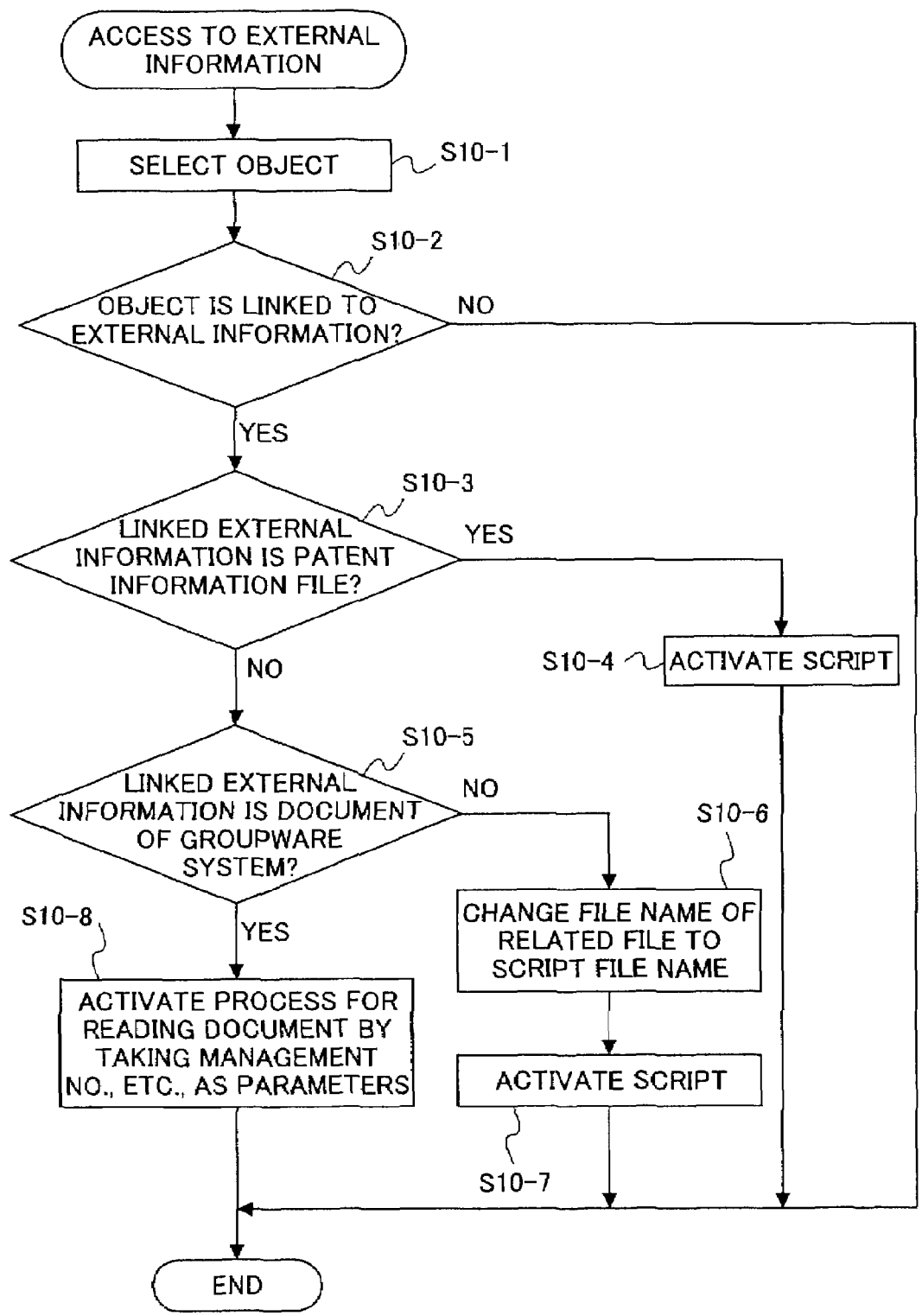

TREE SYSTEM DIAGRAM OUTPUT METHOD, COMPUTER PROGRAM AND RECORDING MEDIUM

BACKGROUND OF THE INVENTION

1. Field of the Invention

The present invention generally relates to a method and a program for representing the correlation of a plurality of correlated objects by a tree system diagram on a computer.

2. Description of the Related Art

In a development process, a design process and the like of a product, a method is known that represents the correlation of a technical problem to be solved in developing or designing the product and a solution of the problem by a tree system diagram. Items that a developer and a designer must cope with are organized by using the tree system diagram so as to make the development process and the design process more efficient.

Conventionally, the developer and designer have been using spreadsheet software or documentation software to create the tree system diagram.

However, there is a problem in that it takes time to create the tree system diagram by using the spreadsheet software or documentation software on a word-processing function basis. In addition, it is difficult to update the created tree system diagram when an update such as a modification or an addition is required. Further, when working on a new development process and design process, it is difficult to reuse the tree system diagram created earlier when trying to create a tree system diagram for a new development process or a new design process.

Additionally, in the tree system diagram, in order to check a specific object and a plurality of correlated objects, it is necessary to follow the specific object and the correlated objects in the entire tree system diagram that is created. Thus, in checking the specific item and the correlated items, especially when the created tree system diagram is large, there is a problem in that not only is a long time required but also omissions tend to occur in the checking.

Further, with respect to each of the objects in the tree system diagram, the information that is not displayed on the tree system diagram is referred to separately. Therefore, there is a problem in that the information that is not displayed on the tree system diagram cannot be effectively referred to.

SUMMARY OF THE INVENTION

It is a general object of the present invention to provide an improved and useful tree system diagram output method and tree system diagram output program in which the above-mentioned problems are eliminated.

It is another and more specific object of the present invention to provide a tree system diagram output method and a tree system diagram output program that can output a tree system diagram by reusing a tree system diagram created earlier.

In order to achieve the above-mentioned objects, according to one aspect of the present invention, there is provided a tree system diagram output method of correlating a plurality of objects and outputting the plurality of objects as a tree system diagram, including the steps of: (a) storing, in a first storing part, an identifier specific to each of the plurality of objects which objects are written on a first worksheet; (b) selecting at least one object among the plurality of objects written on the first worksheet; (c) pasting the object selected in the step (b) to a second worksheet; and (d) changing the identifier of the object to be pasted in the step (c) to a second identifier from the identifier stored in the step (a).

According to the above-mentioned aspect of the present invention, it is possible to paste the plurality of objects written on the first worksheet to the second worksheet, and to change the identifier of each of the objects to be pasted to the second identifier.

Additionally, according to another aspect of the present invention, in the tree system diagram output method, the step (d) may include the steps of: (e) storing, in a second storing part, the identifier given to the object on the second worksheet before the object is pasted in the step (c); and (f) giving an identifier other than the identifier stored in the second storing part to the object pasted in the step (c).

According to the above-mentioned aspect of the present invention, the object pasted on the second worksheet may have a different identifier from that of the object selected from the first worksheet.

Additionally, according to another aspect of the present invention, in the tree system diagram output method, the step (f) may include the steps of: (g) counting the number of the objects pasted to the second worksheet; (h) counting the number of the identifiers stored in the second storing part; and (i) giving an identifier obtained by incrementing the identifier stored in the second storing part, when the number counted in the step (g) agrees with the number counted in the step (h).

According to the above-mentioned aspect of the present invention, when the number of the objects pasted on the second worksheet agrees with the number of the identifiers stored in the second storing part, the identifier is given to the object by incrementing the identifier stored in the second storing part. Thus, it is possible to give serial numbers to the identifiers of the objects pasted on the second worksheet.

Additionally, according to another aspect of the present invention, there is provided a computer program for correlating a plurality of objects and outputting the plurality of objects as a tree system diagram, the computer program including the instructions of: (a) causing a computer to store an identifier specific to each of the plurality of objects which objects are written on a first worksheet; (b) causing the computer to select at least one object among the plurality of objects written on the first worksheet; (c) causing the computer to paste the at least one object to a second worksheet; and (d) causing the computer to change the identifier of the object to be pasted to a identifier from the stored identifier.

According to the above-mentioned aspect of the present invention, it is possible to paste the plurality of objects written on the first worksheet to the second worksheet, and to change the identifier of each of the objects to be pasted to the second identifier.

Additionally, according to another aspect of the present invention, in the above-mentioned computer program, the instruction (d) may include the instructions of: (e) causing the computer to store the identifier given to the object on the second worksheet before the object is pasted; and (f) causing the computer to give an identifier other than the stored identifier to the object to be pasted.

According to the above-mentioned aspect of the present invention, the object pasted on the second worksheet may have a different identifier from that of the object selected from the first worksheet.

Additionally, according to another aspect of the present invention, in the above-mentioned computer program, the instruction (f) may include the instructions of: (g) causing the computer to count the number of the objects pasted to the second worksheet; (h) causing the computer to count the number of the stored identifiers; and (i) causing the computer to give an identifier obtained by incrementing the stored identifier, when the counted number of the objects agrees with the counted number of the stored identifiers.

According to the above-mentioned aspect of the present invention, when the number of the objects pasted on the second worksheet agrees with the number of the identifiers stored in the second storing part, the identifier is given to the object by incrementing the identifier stored in the second storing part. Thus, it is possible to give serial numbers to the identifiers of the objects pasted on the second worksheet.

Further, according to another aspect of the present invention, there is provided a computer-readable recording medium that stores the computer program as described above.

It is still another object of the present invention to provide a tree system diagram output method and a tree system diagram output program that can output a tree system diagram in which a specific item and items correlated with the specific item can be easily checked.

In order to achieve the above-mentioned objects, according to another aspect of the present invention, there is provided a tree system diagram output method of correlating a plurality of objects and outputting the plurality of objects as a tree system diagram, including the steps of: (a) storing, in a first storing part, an identifier specific to each of the plurality of objects; (b) storing, in a second storing part, attribute information of each of the plurality of objects as a plurality of respective character information sets, by correlating the attribute information with the identifier given to and specific to each of the plurality of objects; (c) selecting, from the character information sets stored in the second storing part, the character information set that agrees with character information input from a part of inputting the character information; (d) extracting an identifier of one object including the character information set selected in step (c); and (e) outputting the one object given with the identifier extracted in the step (d).

According to the above-mentioned aspect of the present invention, the attribute information of the object is stored in the second storing part as the character information set, and the character information set that agrees with the input character information is selected from the character information sets stored in the second storing part. Thereafter, the identifier of the object including the selected character information set is extracted and the object given with the identifier is output. Hence, it is possible to search the attribute information of the object by the input character information and output the object as the search result.

In addition, according to another aspect of the present invention, the above-described tree system diagram output method may further include: (f) storing, in a third storing part, correlation between an identifier given to one of the plurality of objects and an identifier given to at least another one of the plurality of objects; (g) selecting an identifier correlated with the identifier given to the one object and extracted in the step (d) according to the correlation stored in the third storing part; and (h) outputting a tree system diagram in which the one object given with the identifier extracted in the step (d) is correlated with the object given with the identifier selected in the step (g).

According to the above-mentioned aspect of the present invention, the identifier given to one object and the identifier given to another object are correlated and stored. Then, according to the correlation, an output is made for the tree system diagram in which the object extracted based on the input character information is correlated with the object given with the identifier that is correlated with the identifier of the extracted object. Thus, by inputting the character information, it is possible to output the tree system diagram that represents the object having the attribute information including the input character information and the correlated object.

Also, according to another aspect of the present invention, there is provided a computer program for correlating a plurality of objects and outputting the plurality of objects as a tree system diagram, the computer program including the instructions of: (a) causing the computer to store an identifier specific to each of the plurality of objects; (b) causing the computer to store attribute information of each of the plurality of objects as a plurality of respective character information sets, by correlating the attribute information with the identifier given to and specific to each of the plurality of objects; (c) causing the computer to select, from the stored character information sets, the character information set that agrees with character information input from a part of inputting the character information; (d) causing the computer to extract an identifier of one object including the selected character information set; and (e) causing the computer to output the one object given with the extracted identifier.

According to the above-mentioned aspect of the present invention, the attribute information of the object is stored in the second storing part as the character information set, and the character information set that agrees with the input character information is selected from the character information sets stored in the second storing part. Thereafter, the identifier of the object including the selected character information set is extracted and the object given with the identifier is output. Hence, it is possible to search the attribute information of the object by the input character information and output the object as the search result.

Moreover, according to another aspect of the present invention, the above-described computer program may further include the instructions of: (f) causing the computer to store correlation between an identifier given to one of the plurality of objects and an identifier given to at least another one of the plurality of objects; (g) causing the computer to select an identifier correlated with the identifier given to the extracted one object according to the stored correlation; and (h) causing the computer to output a tree system diagram in which the one object given with the extracted identifier is correlated with the object given with the selected identifier.

According to the above-mentioned aspect of the present invention, the identifier given to one object and the identifier given to another object are correlated and stored. Then, according to the correlation, an output is made for the tree system diagram in which the object extracted based on the input character information is correlated with the object given with the identifier that is correlated with the identifier of the extracted object. Thus, by inputting the character information, it is possible to output the tree system diagram that represents the object having the attribute information including the input character information and the correlated object.

Further, according to another aspect of the present invention, there is provided a computer-readable recording medium that stores the computer program as mentioned above.

It is yet another object of the present invention to provide a tree system diagram output method and a tree system diagram output program that can effectively refer to external information.

In order to achieve the above-mentioned objects of the present invention, according to another aspect of the present invention, there is provided a tree system diagram output method of correlating a plurality of objects and outputting the plurality of objects as a tree system diagram, including the steps of: (a) storing, in a first storing part, an identifier specific to each of the plurality of objects; (b) setting a link between information stored in an external database and the identifier; and (c) storing, in a second storing part, the link between the information stored in the external database and the identifier, the link being set in the step (b).

According to the above-mentioned aspect of the present invention, the identifier specific to each of the objects is linked to the information stored in the external database. Thus, it is possible to correlate each of the objects with the information stored in the external database.

Also, according to another aspect of the present invention, the tree system diagram output method may further include the step of: (d) reading the information stored in the external database, the information being linked to the identifier of one selected object among the plurality of objects.

According to the above-mentioned aspect of the present invention, the information that is stored in the external database and is linked to the identifier of the selected object is read. Therefore, it is possible to read the information that is stored in the external database and that corresponds to the selected object.

Additionally, according to another aspect of the present invention, in the tree system diagram output method, the external database may be connected to the computer via a network.

According to the above-mentioned aspect of the present invention, it is possible to read the information that is stored in the external database and that corresponds to each of the objects via the network.

Further, according to another aspect of the present invention, in the tree system diagram output method, the external database may also be connected to the computer via the Internet.

According to the above-mentioned aspect of the present invention, it is possible to read the information that is stored in the external database and that corresponds to each of the objects via the Internet.

Moreover, according to another aspect of the present invention, there is provided a computer program for correlating a plurality of objects and outputting the plurality of objects as a tree system diagram, including the instructions of: (a) causing a computer to store an identifier specific to each of the plurality of objects; (b) causing the computer to set a link between information stored in an external database and the identifier; and (c) causing the computer to store the set link between the information stored in the external database and the identifier.

According to the above-mentioned aspect of the present invention, the identifier specific to each of the objects is linked to the information stored in the external database. Thus, it is possible to correlate each of the objects with the information stored in the external database.

In addition, according to another aspect of the present invention, the computer program may further include the instruction of: (d) causing the computer to read the information stored in the external database, the information being linked to the identifier of one selected object among the plurality of objects.

According to the above-mentioned aspect of the present invention, the information that is stored in the external database and is linked to the identifier of the selected object is read. Therefore, it is possible to read the information that is stored in the external database and that corresponds to the selected object.

Further, according to another aspect of the present invention, there is provided a computer-readable recording medium that stores the above-described computer program.

According to the present invention, it is possible to output the tree system diagram that can reuse the tree system diagram created earlier.

Also, according to the present invention, it is possible to output the tree system diagram with which the confirmation of a specific item (object) and an item correlated with the specific item can be easily performed.

In addition, according to the present invention, it is possible to output the tree system diagram with which the external information can be effectively referred.

Other objects, features and advantages of the present invention will become more apparent from the following detailed description when read in conjunction with the following drawings.

BRIEF DESCRIPTION OF THE DRAWINGS

FIG. 1 is a system block diagram of a computer system of the present invention;

FIG. 2 is an explanatory diagram of a tree system diagram of problem-achieving means;

FIG. 8 is a flow chart for explaining the procedure of a process of correlating objects;

FIG. 9A is an explanatory diagram for explaining a copy/paste process according to a first embodiment;

FIG. 9B is another explanatory diagram for explaining the copy/paste process;

FIG. 11A is an explanatory diagram for explaining a cut/paste process according to the first embodiment;

FIG. 11B is another explanatory diagram for explaining the cut/paste process;

FIG. 15 is an explanatory diagram of a partially extracted tree system diagram representing a search result;

FIG. 16 is an explanatory diagram of a table used in searching;

FIG. 21 is a flow chart for explaining the procedure of access to external information according to the third embodiment.

DETAILED DESCRIPTION OF THE PREFERRED EMBODIMENTS

Figure 3:
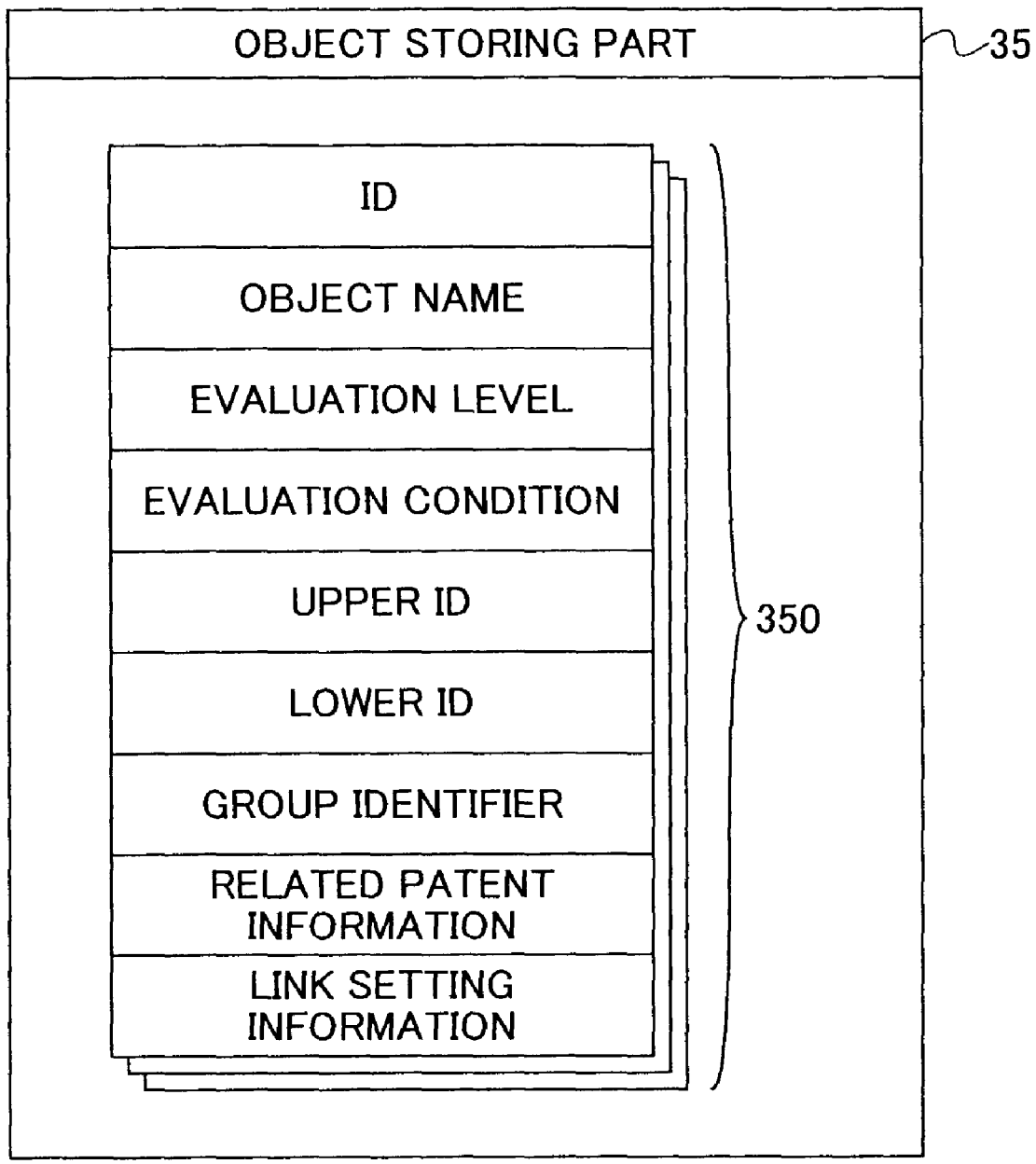
FIG. 3 is an explanatory diagram of data recorded to an object storing part.

In the following, a description will be given of preferred embodiments that put the present invention into effect. In the embodiments, a problem and a corresponding solution are represented by using a tree system diagram.

First, a description will be given of the system configuration of a computer system embodying the present invention, with reference to FIG. 1.

A computer system 20 includes a processor 22, a main memory 23, a ROM (read only memory) 24, an external storage device 25 and a communication interface 29 that are mutually connected via a bus 21. In addition, the bus 21 of the computer system 20 is connected to a display 26, a keyboard 27 and a cursor control 28. Further, the communication interface 29 is connected to a LAN 31 via a network link 30. The LAN 31 is connected to a server 32. Furthermore, the LAN 31 is connected to an IP network 33.

The processor 22 carries out a process such as execution of a command stored in the main memory 23.

The main memory 23 is a RAM (random access memory), a dynamic storage device (a DRAM (dynamic RAM), for example), a SRAM (static RAM), SDRAM (synchronous DRAM), or a flash RAM. The main memory 23 stores information and a command executed by the processor 22. In addition, the main memory 23 is also used for storing a temporary parameter and other intermediate information in the execution of the command carried out by the processor 22.

The ROM 24 stores static information and the command executed by the processor 22. The ROM 24 may be another static storage device (for example, PROM (programmable ROM), EPROM (erasable PROM), EEPROM (electrically erasable PROM)).

The external storage device 25 is a magnetic disk or an optical disk, and stores information or a command.

Further, the computer system 20 may include a logical device for a special object and a logical device that can be modified/reused. The logical device for the special object may be an ASIC (application specific integrated circuit), for example. The logical device that can be modified/reused may be a GAL (generic array of logic) or a re-programmable FPGA (field programmable gate array), for example.

Additionally, the computer system 20 may include another portable medium (for example, a compact disk, tape, and a portable magnetic optical medium)(not shown), a fixed high-density medium (not shown), a compact disk reader (not shown), a compact disk reader/writer (not shown), or a compact disk jukebox (not shown). Each of them uses an appropriate bus (for example, a SCSI (small computer system interface) bus, an extended IDE (integrated device electronics) bus, or a DMA (ultra-direct memory access) bus).

The display 26 is for displaying information to a user. The display 26 is a CRT (cathode ray tube), for example. The display 26 may be controlled by a graphics card.

The keyboard 27 is an input device for inputting a command and the like.

The cursor control 28 transmits direction information and command selection to the processor 22. The cursor control 28 is for controlling the movement of a cursor on the display 26. The cursor control 28 is a mouse, a track ball or a cursor direction key, for example.

Further, the computer system 20 may be connected to a printer (not shown). The printer may print data stored or generated by the computer system 20.

The computer system 20 carries out a part of or all steps of the process of the present invention, according to how the processor 22 carries out the command stored in the main memory 23 or the external storage device 25. The command stored in a medium that can be read by another computer, such as the external storage device 25, may be read by the main memory 23. In addition, the command may be carried out by multiprocessing.

Additionally, in order to put the present invention into effect, an electric circuit of hardware may be used instead of or with the command (the command of software).

As described above, the computer system 20 includes at least one computer-readable medium and memory. The computer-readable medium and memory are used for carrying out the process relating to the present invention and storing data structures, tables, records or instructions including other data as will be described below. The present invention includes software for controlling the computer system 20, driving one or a plurality of devices that carry out the present invention, and enabling the computer system 20 to have a dialogue with a user. The software is stored in one or a plurality of computer-readable media. The software may include a driver, an operating system, a development tool, and application software, however, they are not limitations. The above-mentioned computer-readable storage medium further stores a program for carrying out a part of or all the process executed in performing the present invention.

Computer code used in performing the present invention may be in any programming language such as a script language. The computer code may include a script, an interpreter, a dynamic-link library, a JAVA (registered trademark) class, and code of a programming language very similar to a machine language; however, they are not limitations. Further, the process of the present invention may be performed in a distributed manner.

The computer-readable medium may be any medium that provides data or an instruction provided to the processor 22. The computer-readable medium may be a nonvolatile medium, a volatile medium or a transfer medium; however, they are not limitations. The nonvolatile medium may be an optical disk such as the external storage medium 25, a magnetic disk, or a magnetic optical disk. The volatile medium may be a dynamic memory such as the main memory 23. The transfer medium may be a coaxial cable, a copper wire, and an optical fiber including a wire constituting the bus 21. In addition, the transfer medium may be sound waves or light waves that are generated in electric wave or infrared light data communication.

The computer-readable medium may be either a storage or transmission medium, examples of storage medium includes a hard disk, a floppy disk (registered trademark), a tape, a magnetic optical disk, a PROM (for example, an EPROM, and EEPROM, and a flash EPORM), a DRAM, a SRAM, a SDRAM or another magnetic medium, a compact disk disk (for example, a CD-ROM) or other optical medium, punched cards, paper tape or another physical medium having a hole pattern, and other computer-readable media. Example of the transmission medium includes a carrier wave.

The computer-readable medium may be used in the execution of the command by the processor 22. For example, at first, the command may be executed by a magnetic disk of a remote computer. The remote computer may load the command to a dynamic memory and transmit the command via a telephone line using a modem so as to execute a part of or all the process of the present invention in a remote environment.

Additionally, the computer system 20 may include a modem (not shown) and an infrared light detector (not shown). The modem may transmit/receive data through a telephone line, and an infrared light transfer device may be used so as to convert the data into an infrared light signal. The infrared light detector is connected to the bus 21, receives data transmitted by the infrared light signal, and outputs the data to the bus 21.

Further, the command received by the main memory 23 may be arbitrarily stored in the external storage device 25 before or after the execution by the processor 22.

The communication interface 29 provides bi-directional data communication via the network link 30 connected to a local network (for example, the LAN 31). For example, the communication interface 29 may be a network interface card. In addition, the communication interface 29 may be an ADSL (asymmetrical digital subscriber line) card, an ISDN (integrated services digital network) card, or a modem providing data communication connection according to the kind of the communication of the telephone line. Furthermore, the communication interface 29 may be a wireless link. In this case, the communication interface 29 transmits/receives an electric signal, an electromagnetic signal or an optical signal.

The network link 30 provides data communication for other data devices via the network. For example, the communication interface 29 is connected to the data device managed by the server 32 or a service provider via the network link 30 and the LAN 31. It should be noted that the service provider provides data communication service via the IP network 33 (for example, the Internet).

Both LAN 31 and IP network 33 use an electronic signal, an electromagnetic signal or an optical signal that transmits a digital data stream. A signal transmitted through various networks, a signal transmitted through the network link 30, and a signal transmitted through the communication interface 29 are typically formed of carrier waves that transmit information. The computer system 20 can transmit/receive data to/from a communication counterpart via the network 31, the network link 30, and the communication interface 29.

Groupware (for example, Notes (registered trademark of the Lotus Development Corporation in the USA)) is installed in the server 32. The groupware system is a tool to improve the productivity of an entire group constituted by not only an individual but also a plurality of members. A system constructed by installing groupware is defined as "a computer system designed to be used in a group constituted by a plurality of members so as to increase the productivity of the group".

The groupware system has an address book to manage addresses of people in/outside a company that are authorized to use the groupware. By selecting a desired address from the address book, it is possible to send an e-mail to the selected address. Moreover, it is also possible to manage a database storing various information items on the groupware system. For example, it is possible to attach a link with an arbitrary database when sending e-mail and to communicate various information items by using a database as a bulletin board.

Furthermore, the server 32 is connected to a patent information search system. In the patent information search system, it is possible to search a desired Patent Gazette with respect to an application filed for a patent or the like by a filing date, a priority date, a gazette date (a date of release, a date of publication, a date of grant, and the like), an applicant, an application number, a publication number, a registration number, an international patent classification, a keyword, and the like.

Next, a description will be given of functions provided for the computer system configured as mentioned above so as to put the present invention into effect.

The processor 22 controls execution of various programs, management of data that will be described later, transmission and reception, and the like. In this embodiment, the processor 22 includes selecting means, changing means, giving means, a first counting means, a second counting means, and an increment identifier giving means. Here, the main memory 23 stores a program for allocating an ID when reusing an object (hereinafter referred to as an "object ID allocation program"), a cut process program and the like. By executing each of the above-mentioned programs, the processor 22 functions as each of the above-mentioned means. The main memory 23 further stores a property registration program, an ID allocation program, a correlation program and the like. For example, the property registration program is a program that registers the properties of an object. The ID allocation program is a program that allocates an ID to an object. The association program is a program that correlates an upper object with a lower object. The object ID allocation program is a program that allocates an ID to a new object to be pasted when copying and pasting a part of a tree system diagram. The cut process program is a program that moves a part of a cut tree system diagram to another worksheet when cutting an object.

The external storage device 25 stores worksheets of spreadsheet software for displaying a tree system diagram 40 as shown in FIG. 2. The worksheet of the spreadsheet software is composed of a table including rows and columns. Each grid (cell) of the table is specified by a row and a column. It should be noted that, in the worksheet displaying the tree system diagram 40, the cells to which objects can be arranged are set by the columns beforehand. That is, in the worksheet shown in FIG. 2, the cells included in the first column, the fourth column, the seventh column and the tenth column (the columns where an important technical problem 41, achieving means 42, individual technical problems 43, and achieving means 44 are respectively arranged) are set such that objects can be positioned to the cells. It should be noted that cells other than the cells capable of arranging the objects thereon display ruled (connecting) lines 45 for indicating the relations among the objects.

The processor 22 allocates, for each of the objects, an ID as an identifier to identify the object. In the worksheet displaying the tree system diagram 40, the cells containing the respective objects display the name and ID of the object. The properties can be set for each of the objects. The properties are specified by the ID of the object. The properties are stored in an object storing part 35 of the external storage device 25.

As shown in FIG. 3, the object storing part 35 stores object information 350 for each ID. The object information 350 includes an ID as an identifier and properties including an object name, an evaluation level, an evaluation condition, an upper ID, a lower ID, a group identifier, related patent information, and link setting information. The object storing part 35 serves as a first storing means and a second storing means by storing the ID.

Figure 4:
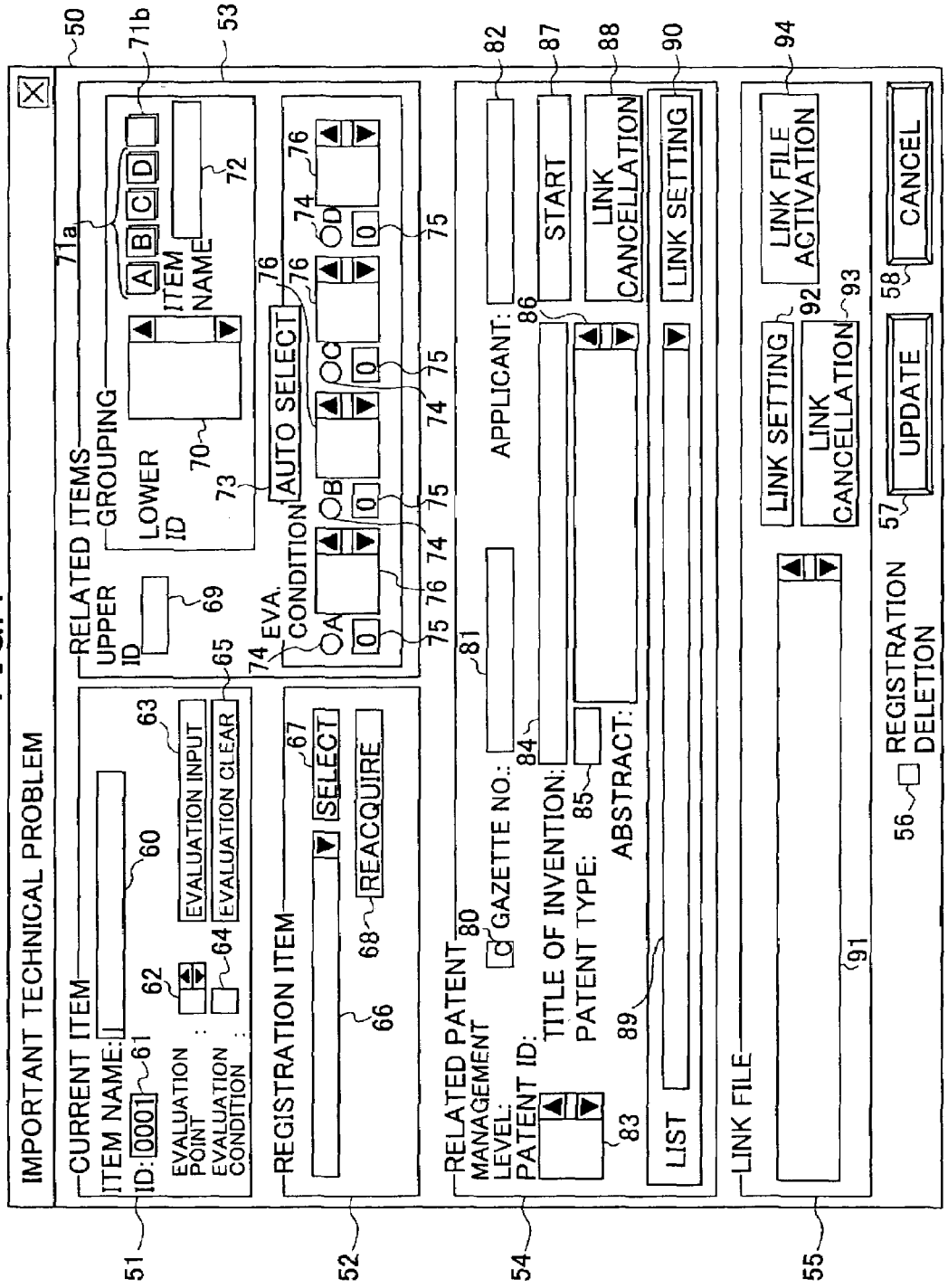
FIG. 4 is an explanatory diagram of a property input window.

The object name is an identification name of an object used by a user. The evaluation level is represented by an evaluation point (from 0 to 3) with respect to the content of the object. The evaluation condition is used when the evaluation of a lower object is used as the evaluation of the object. The upper ID is the ID of an object that is one higher in the hierarchy than the object and is correlated with the object. The lower ID is the ID of an object that is one lower in the hierarchy than the object and is correlated with the object. The group identifier divides lower objects of the object into groups. In this embodiment, there are groups A, B, C and D. The related patent information is information relating to related patents. The link setting information indicates the location of related information stored in an external database. The object name, the evaluation level, the evaluation condition, the upper ID, the lower ID, the group identifier, the related patent information and the link setting information are input and set by the user, in a property setting window 50 as shown in FIG. 4, by using the keyboard 27 or the like.

Figure 5:
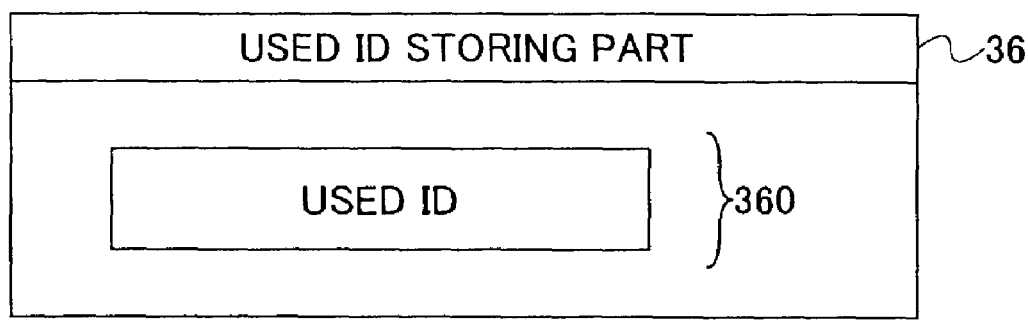
FIG. 5 is an explanatory diagram of data recorded to a used ID storing part.

In addition, the external storing device 25 includes a used ID storing part 36. As shown in FIG. 5, the used ID storing part 36 stores the ID having the largest number among used IDs, as used ID information 360.

The main memory 23 reads and stores (retains a copy of) the worksheets stored in the external storage device 25, the object information 350, and the used ID information 360.

FIG. 2 shows the tree system diagram 40 of problem-achieving means that is displayed on the worksheet of the spreadsheet software on the display 26. The processor 22 causes the display 26 to output the worksheet displaying the tree system diagram 40, according to an output instruction of the tree system diagram 40 input from the keyboard 27, the cursor control 28 or the like.

In the tree system diagram 40 shown in FIG. 2, the objects are technical problems and the achieving means. In this embodiment, the tree system diagram 40 is output on the worksheet of the spreadsheet software, and in the tree system diagram 40, the important technical problem is correlated with the achieving means for solving the important technical problem, the achieving means are correlated with a respective individual technical problem(s), and the individual technical problems are correlated with the respective achieving means. Here, an important technical problem 41 in a highest hierarchy (a first hierarchy) is displayed in the first column, an achieving means 42 in a lower hierarchy (a second hierarchy) is displayed in the fourth column, an individual technical problem 43 in a further lower hierarchy (a third hierarchy) is displayed in the seventh column, and an achieving means 44 in a still lower hierarchy (a fourth hierarchy) is displayed in the tenth column.

Additionally, the upper objects and the lower objects correlated therewith are displayed by being connected by the ruled lines 45. In other words, the object (the important technical problem 41) in the first hierarchy and the object (the achieving means 42) in the second hierarchy correlated therewith are connected by the ruled line 45 that is displayed on the cells in the second and third columns. Similarly, the object in the second hierarchy and the object (the individual technical problem 43) in the third hierarchy correlated therewith, and the object in the third hierarchy and the object (the achieving means 44) in the fourth hierarchy correlated therewith, are connected by the respective ruled lines 45.

The object name and ID are displayed for each of the objects such as "the object name:ID".

Here, as the important technical problem 41, the object having the object name "problem A" and the ID "0001" is displayed. As the lower objects that are correlated with the object "problem A:0001" assuming that the object is the upper object, there are displayed the achieving means 42 ("achieving means A-1:0002", "achieving means A-2:0003", and "achieving means A3:0007"). That is, "0002", "0003" and "0007" are set for the lower ID of the object information 350 relating to the object having the ID "0001". In addition, "0001" is set for the upper ID of the object information 350 relating to the object having the ID "0002", "0003" or "0007". Similarly, the individual technical problems 43 ("problem B:0004" and "problem C:0005") are displayed as the lower objects correlated with the object "achieving means A-1:0002" of the achieving means 42, assuming that the object is the upper object. Further, the achieving means 44 ("achieving means B-1:0012" and "achieving means B-2:0013") are displayed as the lower objects correlated with the object "problem B:0004" of the individual technical problem 43, assuming that the object is the upper object. In this manner, the correlation of the technical problems-achieving means is represented by the tree system diagram 40 in which the technical problems and the achieving means are alternately shown.

Further, a closing line of the cell displaying each of the objects is displayed with a different color for each of the group identifiers. That is, each of the groups "A", "B", "C" and "D" uses a different color for displaying the closing line. Additionally, the evaluation condition is shown by the color of the ruled line 45 on the left side of the cell displaying each of the objects. In other words, for example, when "A" is set as the evaluation condition of an object x, among the lower objects assuming the object x as the upper object, with respect to an object y belonging to the group "A", the ruled line 45 on the left side of the cell displaying the object y is displayed in red color.

The properties of each of the objects (the important technical problem 41, the achieving means 42, the individual technical problem 43, and the achieving means 44) are set by using the property setting window 50 shown in FIG. 4. The property setting window 50 is displayed when an object is selected on the worksheet displaying the tree system diagram 40, and an edit button 47 included in an operation panel 46 (see FIG. 2) is clicked.

As shown in FIG. 4, the property setting window 50 includes a current item setting part 51, a registration item setting part 52, a related item setting part 53, a related patent setting part 54, and a link file setting part 55. Further, a registration deletion check button 56, an update button 57 and a cancel button 58 are provided at the bottom of the property setting window 50.

The current item setting part 51 is for displaying and inputting of an object that is set to a cell selected by the cursor control 28 in the worksheet displaying the tree system diagram 40. The current item setting part 51 includes an item name input box 60, an ID display part 61, an evaluation point input box 62, an evaluation point input button 63, an evaluation condition input box 64, and an evaluation clear button 65. It is possible to input the evaluation point 0 to 3 (0: not evaluated, 1: major problem, 2: problem, 3: no problem) to the evaluation point input box 62. The evaluation point is manually input to the evaluation point input box 62. Besides, when the lower ID exists and the evaluation condition is set as described later, the evaluation point is automatically displayed by reflecting the evaluation point of the lower ID. Here, the evaluation point input button 63 is clicked when the evaluation point is manually input to the evaluation point input box 62. The evaluation clear button 65 is clicked when clearing a value set to the evaluation point input box 62. When the lower ID exists, the evaluation clear button 65 becomes unusable and clearing the evaluation point is prohibited. Further, an allocated temporary ID or an ID registered as an original ID is displayed in the ID display part 61.

The registration item setting part 52 includes a drop-down list 66, a select button 67, and a reacquire button 68. The registration item setting part 52 is used for displaying and selecting the objects that are previously registered, in the worksheet displaying the tree system diagram 40. Items to be displayed are registered beforehand, and the registered items are displayed in the drop-down list 66. In the drop-down list 66, when an item is selected and the select button 67 is clicked, the selected item is displayed in the item name input box 60. In addition, the reacquire button 68 is clicked when reading the registered items displayed in the drop-down list 66 again.

The related item setting part 53 includes an upper ID input box 69, a grouping setting part and an evaluation condition setting part. When the object of the current item is the lower object, the ID of an object that is the upper object with respect to the lower object is automatically input to the upper ID input box. It should be noted that only one ID can be input to the upper ID input box 69. In addition, when the object of the current item is the object (the important technical problem 41) in the highest hierarchy, the upper ID cannot be set.

The grouping setting part includes a lower ID input part 70, group symbol selection buttons 71a, a group release button 71b and an item name display part 72. When the object of the current item is the upper object, the ID of an object that is the lower object with respect to the upper object is automatically input to the lower ID input part 70. A plurality of Ids can be input to the lower ID input part 70. When an ID is selected in the lower ID input part 70, the item name display part 72 displays the object name of the selected lower ID. Thereafter, when the group symbol selection button 71a is clicked, the ID is set to a group ID input part 76 (that will be described later) of the corresponding group. Further, when an ID is selected in the lower ID input part 70 and the group release button 71b is clicked, the group setting is released with respect to the ID.

The evaluation condition setting part includes an automatic selection button 73, group selection radio buttons 74, evaluation point input boxes 75, and the group ID input part 76. The evaluation point input boxes 75 display the minimum values among evaluation points of the objects constituting the groups. Here, when the automatic selection button 73 is clicked, the group selection radio button 74 of the group having the minimum value among the evaluation points in the evaluation point input boxes 75 of the respective groups. The group selection radio button 74 is checked when manually selecting the group as the evaluation condition. That is, when any one of the group selection radio buttons 74 is checked, the evaluation condition input box 64 displays the selected group (one of A, B, C and D).

The related patent setting part 54 includes a management level display part 80, a gazette number display part 81, an applicant display part 82, a patent ID selection part 83, a title of invention display part 84, a patent type display part 85, an abstract display part 86, a patent information search system start button 87, a link cancellation button 88, a list selection part 89, and a link setting button 90. The related patent setting part 54 is used when managing the related patent information in conjunction with a patent information search system. The patent information search system start button 87 is clicked when starting the patent information search system. The patent ID selection part 83 displays a patent ID that is linked to the object of the current item. When the patent ID is selected in the patent ID selection part 83, the management level display part 80, the gazette number display part 81, the applicant display part 82, the title of invention display part 84, the patent type display part 85, and the abstract display part 86 display the management level, the gazette number, the applicant, the title of the invention, the patent type and the abstract of the patent information, respectively. In addition, the link cancellation button 88 is clicked when deleting the link. On the other hand, the list selection part 89 displays a list of the patent information set in the patent information search system. When selecting the patent information in the list selection part 89 and clicking the link setting button 90, a link is set between the object of the current item and the selected patent information. Then, the patent ID of the patent information is displayed in the patent ID selection part 83.

The link file setting part 55 includes a link file display part 91, a link setting button 92, a link cancellation button 93 and a link file activation button 94. The link file setting part 55 is used when managing a link file. The link file display part 91 displays a file that is linked to the object of the current item. When the file is selected in the link file display part 91 and the link file activation button 94 is clicked, the selected file is read and displayed. The link set button 92 is used when linking the object of the current item to a related file. The link cancellation button 93 is used when canceling the link of the file selected in the link file display part 91.

Next, a description will be given of the procedure of the system configured as mentioned above.

First, a description will be given of the procedure of registering each object, by referring to FIG. 6.

Figure 6:
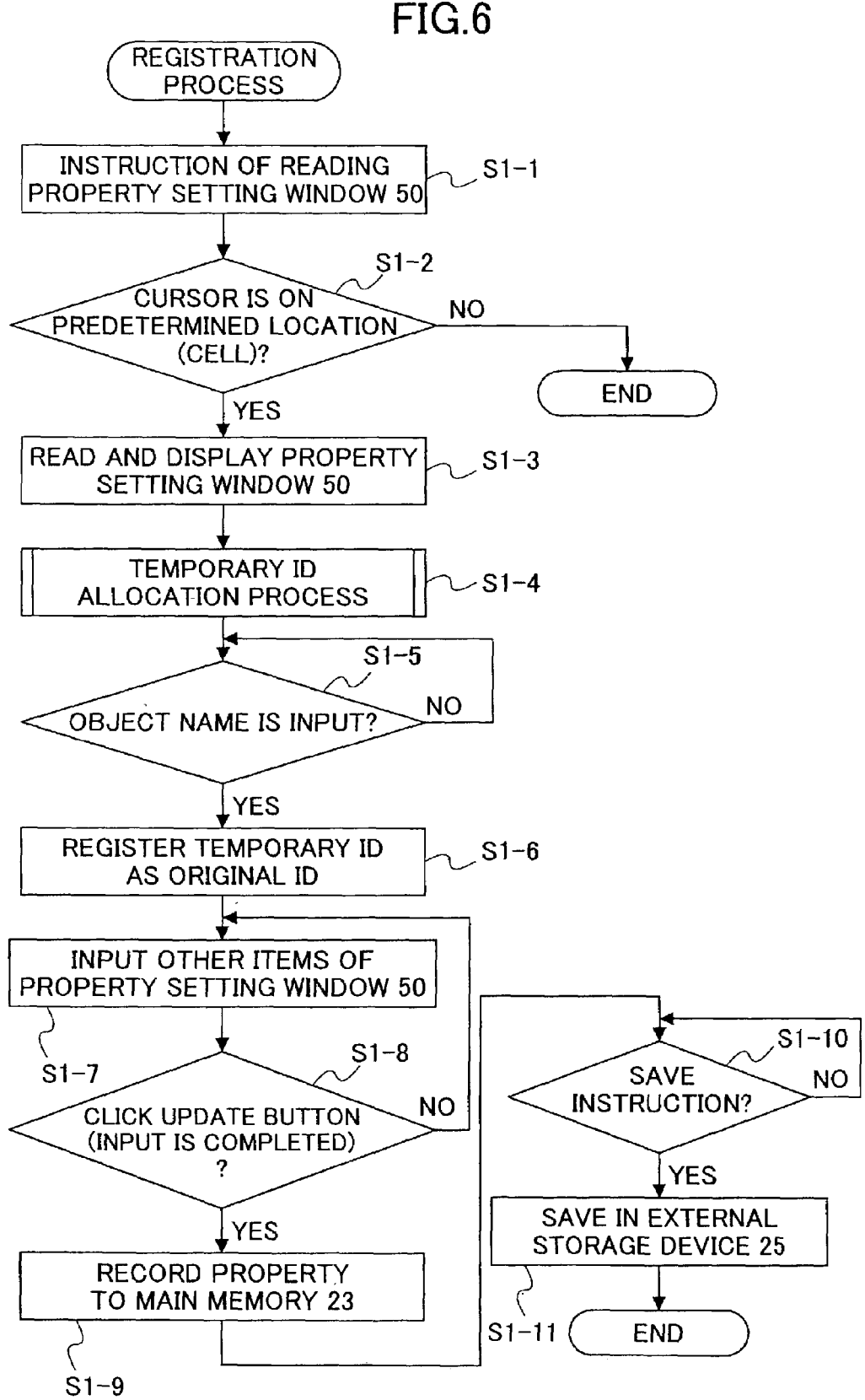
FIG. 6 is a flow chart for explaining the procedure of a registration process.

In FIG. 6, first, in step S1-1, an instruction of reading the property setting window 50 is given. That is, first, the worksheet that displays the tree system diagram 40 is displayed on the display 26, the cell on the worksheet is selected by the cursor control 28, and the edit button 47 on the operation panel 46 is clicked. In response to this, in step S1-2, the processor 22 determines whether or not the cursor is on a predetermined location (cell). The predetermined location refers to the cell where the object can be set. That is, the cell that is in a row where the object can be arranged and where another object is not set. Then, when the cursor is not on the cell to which the object can be set (NO in step S1-2), the processor 22 ends processing. On the other hand, when the cursor is on the cell to which the object can be set (YES in step S1-2), in step S1-3, the processor 22 reads information for displaying the property setting window 50 from the main memory 23, and causes the main memory 23 to display the property setting window 50 shown in FIG. 4 on the display 26.

Figure 7:
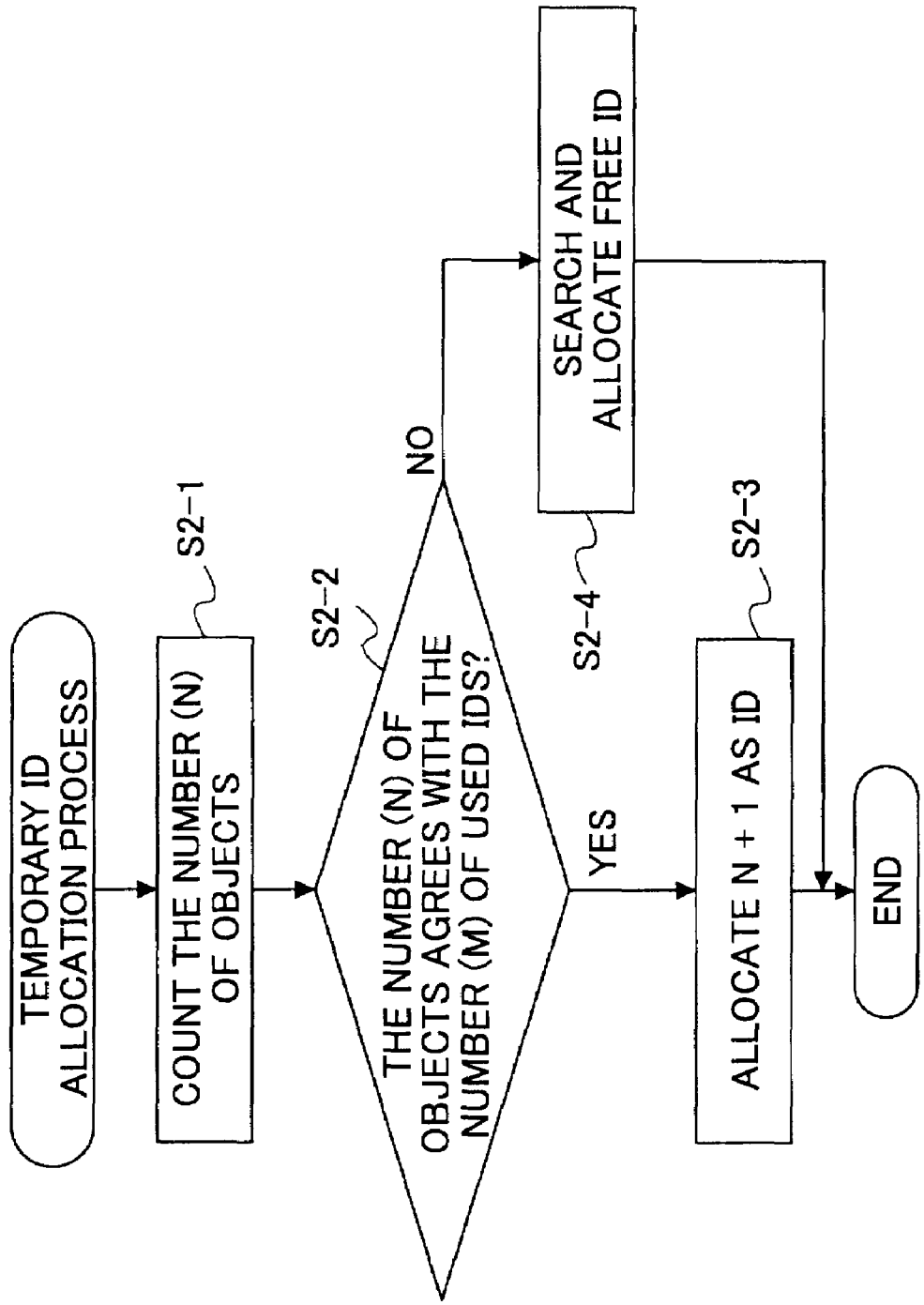
FIG. 7 is a flow chart for explaining the procedure of an ID allocation process.

Next, in step S1-4, the processor 22 carries out a temporary ID allocation process for allocating a temporary ID to the target object. It should be noted that the processor 22 carries out the temporary ID allocation process according to the ID allocation program. FIG. 7 shows a procedure of the temporary ID allocation process. In the temporary ID allocation process, when sequence numbers are given to the IDs and there are no free IDs, the number that is the next higher than the maximum number used already is allocated to a temporary ID. On the other hand, when there are free IDs (when objects are deleted and the IDs given to the deleted objects are the free IDs), among the free IDs, the ID having the smallest number is allocated as a temporary ID.

As shown in FIG. 7, in step S2-1, the processor 22 counts the number (n) of the objects that are already stored in the object storing part 35 and to which IDs are allocated. In addition, the processor 22 reads the used ID information 360 from the used ID storing part 36 of the external storage device 25, and causes the main memory 23 to store the number (m) of the used IDs. Then, in step S2-2, the processor 22 determines whether or not the number of the counted objects agrees with the number of the used IDs. When they agree (YES in step S2-2), the processor 22 allocates (n+1) to the object as a temporary ID, and ends the process. It should be noted that, in this case, the processor 22 stores, in the main memory 23, the allocated temporary ID (n+1) as the ID having the largest number among the used IDs, and updates the number of the used IDs. When they do not agree (NO in step S2-2), the processor 22 successively searches the free IDs in ascending order, allocates the first found free ID as the temporary ID of the object in step S2-4, and ends the process. In addition, the allocated temporary ID is displayed in the ID display part 61 of the property setting window 50.

Then, in step S1-5, it is determined whether or not an object name is input. When the user inputs an object name into the item name input box 60 of the current item setting part 51 (YES in step S1-5), the processor 22 registers the allocated temporary ID to the object storing part 35 as an original ID in step S1-6. At this moment, the processor 22 updates the used ID storing part 36 with the number of the used IDs stored in the main memory 23 as the used ID information 360. When the object name is not input to the item name input box 60 (No in step S1-5), the processor 2 makes display 26 prompt for the input of the item name, and stores the ID to the object storing part 35 when the item name is input.

Further, the properties can be registered with respect to the objects of which the IDs are registered as mentioned above. That is, in step S1-7, the user inputs other items of the property setting window 50, and when the input is completed, the user clicks the update button 57 by the cursor control 28 or the like. In step S1-8, it is determined whether the update button 57 is clicked (the input is completed). When the input is not completed (NO in step S1-8), the process returns to step S1-7. When the update button 57 is clicked (YES in step S1-8), the processor 22 records the properties to the main memory 23 in step S1-9. It should be noted that the processor 22 carries out this property registration process according to the property registration program.

Additionally, in step S1-10, it is determined whether or not a save instruction is given. When the user gives the save instruction of the object information 350 by the keyboard 27 or the like (YES in step S1-10), the processor 22 saves the worksheets of the spreadsheet software and the object information 350 in the external storage device 25 in step S1-11. When the save instruction is not given (NO in step S1-10), the processor 22 waits until the save instruction is given.

Furthermore, update registration of the properties can be performed with respect to the objects registered as mentioned above. In this case, the property setting window 50 is displayed with respect to the registered objects, and the property update registration is performed on the objects according to steps S1-7 through S1-10.

Next, a description will be given of a process of correlating the object, which is registered as mentioned above, with another object, by referring to a flow chart in FIG. 8.

As shown in FIG. 8, in step S3-1, the user selects one object by the cursor control 28 on the worksheet of the tree system diagram 40 displayed on the display 26, and clicks a tree creation button 48. Then, successively, the user selects another object by the cursor control 28 on the worksheet of the tree system diagram 40, and carries out a selection complete operation (for example, double-clicking by the mouse) in step S3-2. In step S3-3, the processor 22 determines whether or not the IDs of the two objects that are selected by the above-described operation agree.

When the IDs of the two objects agree (NO in step S3-3), the processor 22 causes the display 26 to display an error message and ends the process. On the other hand, when the IDs of the two objects do not agree (YES in step S3-3), in step S3-4, the processor 22 determines, with respect to the two objects, whether the difference between the two objects is "−1" (one hierarchy higher) or "+1" (one hierarchy lower). When the difference of the two objects corresponds to neither (NO in step S3-4), the processor 22 causes the display 26 to display an error message in step S3-6 and ends the process. When the difference is "−1" or "+1" (YES in step S3-4), in step S3-5, the processor 22 updates (adds, in this case) the information of the upper ID and the lower ID (the object information 350) of the properties (stored in the object storing part 35) of the selected objects. In other words, with respect to the selected objects, the input upper ID and lower ID are set and stored in the main memory 23 as the upper ID and lower ID of the object information 350. Further, with respect to the object of the input upper ID, the ID of the selected object is set and recorded in the main memory 23 as the lower ID of the object information 350. In addition, with respect to the input lower ID, the ID of the selected object is set and recorded in the main memory 23 as the upper ID of the object information 350. Then, when the save instruction is given, the processor 22 stores the information relating to the correlation of the objects recorded in the main memory 23 in the object storing part 35 of the external storage device 25.

Based on the above-described storing operation, the processor 22 automatically creates the ruled line 45 that connects the two objects on the worksheet displaying the tree system diagram 40.

First Embodiment

Next, a description will be given of the first embodiment of the present invention, by referring to FIGS. 9A through 12.

First, a description will be given of a case where the object is copied and pasted (a copy/paste process), by referring to FIGS. 9A, 9B and 10. FIG. 9A shows a worksheet displaying a tree system diagram 100a before the copy/paste process. FIG. 9B shows a worksheet displaying a tree system diagram 100b after the copy/paste process. It should be noted that the worksheet including the object to be copied is a first worksheet. In addition, a worksheet including the pasted object is a second worksheet. The first and second worksheets may be the same worksheet or different worksheets. Here, the object to be copied is pasted on a worksheet (the worksheet shown in FIG. 9A) that includes the object to be copied. Additionally, FIG. 10 is a flow chart showing the procedure of the copy/paste process.

As shown in FIG. 9A, five objects are shown on the worksheet displaying the tree system diagram 100a before the process, and serial numbers "0001" through "0005" are allocated to the five objects as their IDs. Accordingly, before the process, the object storing part 35 stores five sets of the object information 350 corresponding to the serial numbers "0001" through "0005".

Figure 10:
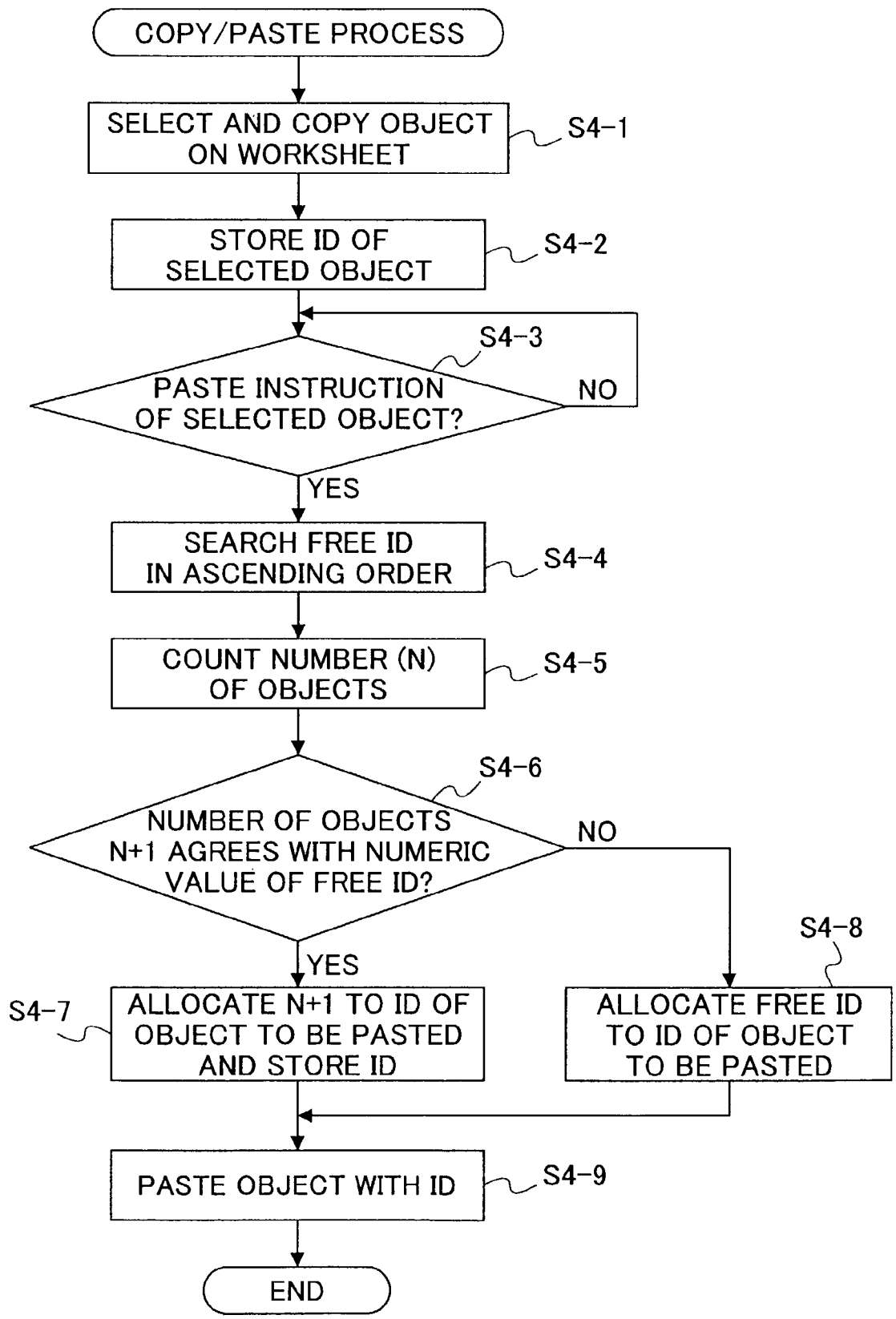
FIG. 10 is a flow chart for explaining the procedure of the copy/paste process.

As shown in FIG. 10, in the copy/paste process, first, the object on the worksheet is selected and copied in step S4-1. That is, the user selects the object on the worksheet displaying the tree system diagram 100a, and clicks a copy button 111 of the operation panel 46. Here, an object 101 ("problem b:0005") is selected, and the copy button 111 of the operation panel 46 is clicked. In response to this, in step S4-2, the processor 22 causes the main memory 23 to store the ID of the selected object. Hence, "0005" is stored as the selected ID.

Next, the user gives a paste instruction of the selected object. That is, the user selects a pasting location on the worksheet and clicks a paste button 112 of the operation panel 46. Here, a location (cell) 102 is selected as the pasting location. In step S4-3, it is determined whether or not the paste instruction is given. When the paste instruction of the selected object is not given (NO in step S4-3), the processor 22 waits (step S4-3 is repeated) until the paste instruction is given. On the other hand, when the paste instruction of the selected object is given (YES in step S4-3), the processor 22 carries out the following process according to the object ID allocation program stored in the main memory 23 so as to allocate an ID to the object to be pasted. That is, in step S4-4, the processor 22 sequentially searches for a free ID in ascending order in the object storing part 35. That is, the processor 22 counts the IDs in the object storing part 35 until a free ID is found. Here, the smallest free ID is "0006". In step S4-5, the processor 22 counts the number (n) of the objects in the object storing part 35. Here, five objects are counted.

Next, in step S4-6, the processor 22 determines whether or not the number (n+1) obtained by adding one to the number (n) of the counted objects agrees with the numeric value of the searched free ID. When the number n+1 agrees with the numeric value of the free ID (YES in step S4-6), the processor 22 allocates n+1 to the ID of the object to be pasted and causes the main memory 23 to store the ID in step S4-7. In other words, the object to be pasted is allocated the ID obtained by incrementing by one the numeric value of the ID having the maximum numeric value among the searched IDs in the object storing part 35. Here, since the number n+1 agrees with the numeric value of the free ID, "0006" corresponding to n+1 is allocated to the ID of the object.

On the other hand, when the number n+1 does not agree with the numeric value of the free ID (NO in step S4-6), in step S4-8, the processor 22 allocates the free ID to the ID of the object to be pasted and causes the main memory 23 to store the ID.

Then, in step S4-9, the processor 22 pastes the object to which the ID is allocated as described above, and ends the process. That is, the processor 22 pastes a new object having the ID allocated as mentioned above to the selected pasting location. It should be noted that the pasted object maintains the properties of the copied object. Therefore, the object name of the new object is the same as that of the copied object. Here, as shown in FIG. 9B, the tree system diagram 100b is shown in which a new object 103 allocated with "0006" as the ID is pasted to the location 102. It should be noted that "problem b:0006" representing "object name:ID" is shown in the object 103.

Next, a description will be given of a case where the object is cut and pasted (a cut/paste process), by referring to FIGS. 11A, 11B and 12.

FIG. 11A shows a worksheet displaying a tree system diagram 120a before the cut/paste process. FIG. 11B shows a worksheet displaying a tree system diagram 120b after the cut/paste process. FIG. 12 is a flow chart showing the procedure of the cut/paste process.

In the cut/paste process, a plurality of objects can be processed by designating an area on the worksheet. In this case, the cut process can be performed when, in a part of the tree system diagram 120a included in the designated area, the object in the highest hierarchy is not correlated with an upper object.

Hence, first, in the worksheet of FIG. 11A, the correlation between the object in the highest hierarchy in the group of the object to be cut and the upper object is cancelled (deleted). Hence, the setting of the upper ID is deleted in the object information 350 of the object in the highest hierarchy in the group of the object to be cut. In addition, with respect to the object information 350 of the object corresponding to the upper ID, among the settings of the lower IDs, the setting of the lower ID relating to the object in the highest hierarchy in the group of the object to be cut is deleted.

Here, it is assumed that a group of three objects shown as "problem a:0004", "means 3:0008" and "means 4:0009" that are included in a cut area 121 is cut. In this case, the correlation between an object 122 ("problem a:0004") that is in the highest hierarchy in the group of the objects to be cut and an object 123 ("means 1:0002") that is the upper object is canceled. In other words, the ruled line 124 in the cells on the left side of the object 122 is deleted.

As just described, with respect to the tree system diagram 120a, after canceling the correlation between the object in the highest hierarchy in the part that is cut and pasted and the upper object, the following process is performed.

Figure 12:
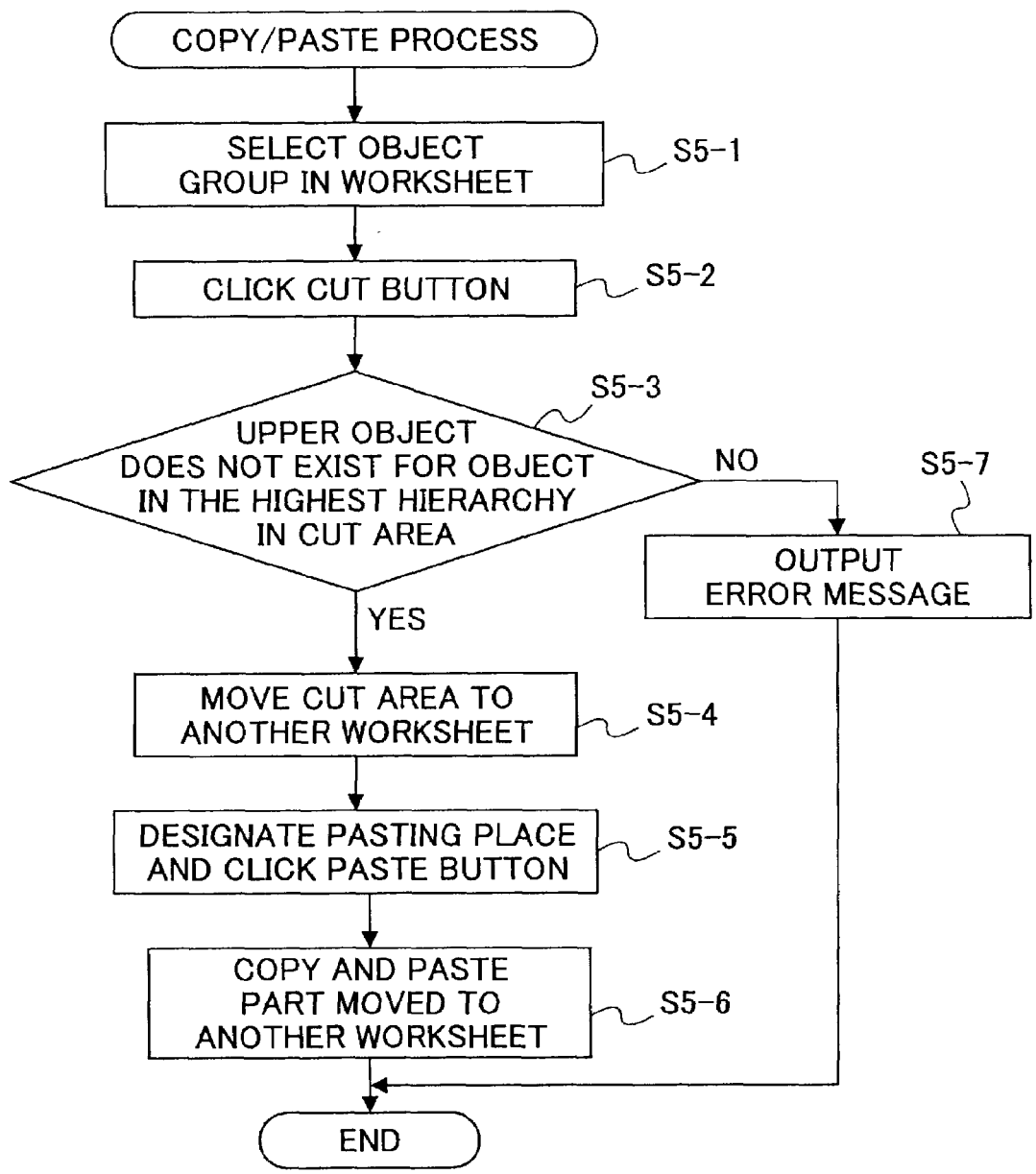
FIG. 12 is a flow chart for explaining the procedure of the cut/paste process.

As shown in FIG. 12, first, in step S5-1, the user selects an object group in the worksheet. Here, the cut area 121 is selected. Next, in step S5-2, the user clicks a cut button 113 of the operation panel 46.

In response to this, in step S5-3, the processor 22 determines whether or not an upper object exists for the object that is in the highest hierarchy and is a cut target. In other words, the processor 22 determines whether or not the upper ID is set in the object information 350 of the object 122 "problem a:0004" that is in the highest hierarchy and is a cut target. Here, as described above, by deleting the ruled line 124, the setting of the upper ID in the object information 350 of the object 122 "problem a:0004" is deleted.

When an upper object exists for the object that is in the highest hierarchy and is the cut target (NO in step S5-3), the processor 22 outputs an error message in step S5-7, and ends the process. On the other hand, when the upper object does not exist for the object that is in the highest hierarchy and is the cut target (YES in step S5-3), in step S5-4, the processor 22 moves the cut area 121 to another worksheet (not shown) according to the cut process program stored in the main memory 23. That is, the objects in the cut area 121 are cut from the worksheet displaying the tree system diagram 120a, and the objects in the cut area 121 are pasted to another worksheet. In addition, the object information 350 corresponding to the three objects "problem a:0004", "means 3:0008" and "means 4:0009" is deleted from the object storing part 35 that corresponds to the worksheet displaying the tree system diagram 120a. Further, the object information 350 corresponding to the three objects is stored in the object information storing part 35 that corresponds to the other worksheet.

Next, in step S5-5, the user designates a pasting location on the worksheet and clicks a paste button 114 of the operation panel 46. Here, a pasting place 125 is designated. In response to this, in step S5-6, the processor 22 copies the part (the objects in the cut area 121) that is moved to another worksheet, pastes the part to the designated location, and ends the process. That is, the copy/paste process is performed. In other words, the processor 22 copies the objects corresponding to the part moved to another worksheet, and pastes the objects to the designated location by allocating new IDs to the objects. Here, the cut area 121 moved to another worksheet is pasted to the pasting location 125. With respect to the newly allocated IDs, since the cut area 121 is pasted to the same worksheet from which the cut area 121 is cut, the IDs of the original objects, which are deleted when the cut area 121 is moved to another worksheet, are the free IDs. Thus, the IDs (the free IDs) of the original objects are allocated as new IDs to the same respective pasted objects. That is, as shown in FIG. 11B, the tree system diagram 120b where the three objects "problem a:0004", "means 3:0008" and "means 4:0009" are pasted is shown.

As described above, according to the first embodiment, the following effects can be obtained.

In the first embodiment, when copying and pasting the object in the tree system diagram 100a, the new object is allocated an ID different from the ID of the object to be copied. Hence, it is possible to allocate a unique ID to a new object.

Additionally, in the first embodiment, in the copy/past process, when the number (n+1) of objects added with one agrees with the numeric value of the free ID, the new object to be pasted is given the ID that is obtained by incrementing the free ID. Hence, it is possible to allocate serial numbers to the IDs.

Further, in the first embodiment, in the copy/paste process, when the free ID is searched in an ascending order and the number (n+1) of objects does not agree with the numeric value of the free ID, the new object to be pasted is given the searched (and located) free ID. Hence, when the object is deleted and the like, it is possible to allocate an ID to the new object to be pasted by using the free ID.

In addition, in the first embodiment, in the copy/paste process, the part (the cut area 121) including a plurality of objects in the tree system diagram 120a is moved to another worksheet, and the moved part is copied and pasted to the pasting location 125. Hence, it is possible to paste the objects included in the cut area 121 while maintaining the correlation among the pasted objects.

Additionally, in the first embodiment, in the cut/paste process, when copying and pasting the part moved to another worksheet, it is possible to allocate an ID to the object to be pasted in a manner similar to the copy/paste process. Hence, in the worksheet where the object is pasted, a unique ID is given to the object to be pasted.

Further, the first embodiment may be modified as follows.

In the first embodiment, in the copy/paste process, the copying and pasting are performed on one object. However, the copying and pasting may be performed on a plurality of objects. In this case, the copying and pasting may be performed such that the cells to be copied are designated, and the objects belonging to a designated area are copied and pasted while maintaining the correlation among the objects in the designated area.

In addition, in the first embodiment, in the cut/paste process, the cutting and pasting are performed on the part including the plurality of objects in the tree system diagram 120a. However, the same process (cutting and pasting) may be performed on only one object.

Additionally, in the first embodiment, in the copy/paste process, the copied object is pasted on the same worksheet as the worksheet displaying the tree system diagram 100a. However, the object may be pasted on a worksheet that is different from the worksheet from which the object is copied. Hence, it is possible to copy and reuse the object on a different worksheet.

Further, in the first embodiment, in the cut/paste process, the cut object is pasted on the worksheet that is the same as the worksheet-displaying the tree system diagram 120a. However, the object may be pasted on a worksheet that is different from the worksheet from which the object is cut. Hence, it is possible to cut and reuse the object on the different worksheet.

Furthermore, in the first embodiment, in the cut/paste process, when pasting the part moved to another worksheet, the cut object is pasted in the manner similar to the copy/paste process. That is, when cutting the object, the object information 350 of the object that is the cut target is deleted, and when pasting the object, the new ID is allocated to the object in the manner similar to the copy/paste process. However, in the cut/paste process in the same worksheet, the ID may remain unchanged. In this case, by storing the original ID, the original ID may be allocated to the object when pasting the object in a case when the object is pasted to the worksheet that is the same as the worksheet from which the object is cut. Hence, in the same worksheet, it is possible to perform the cut/paste process while maintaining the original ID.

Second Embodiment

Next, a description will be given of an extraction process according to the second embodiment of the present invention, by referring to FIGS. 13 through 17. In the extraction process, the object having the object name including character information that matches an input search word is extracted, and the tree system diagram that selectively displays the object and the correlated objects is output. The extraction process is performed according to a partial object extracting program stored in the main memory 23.

Figure 13:
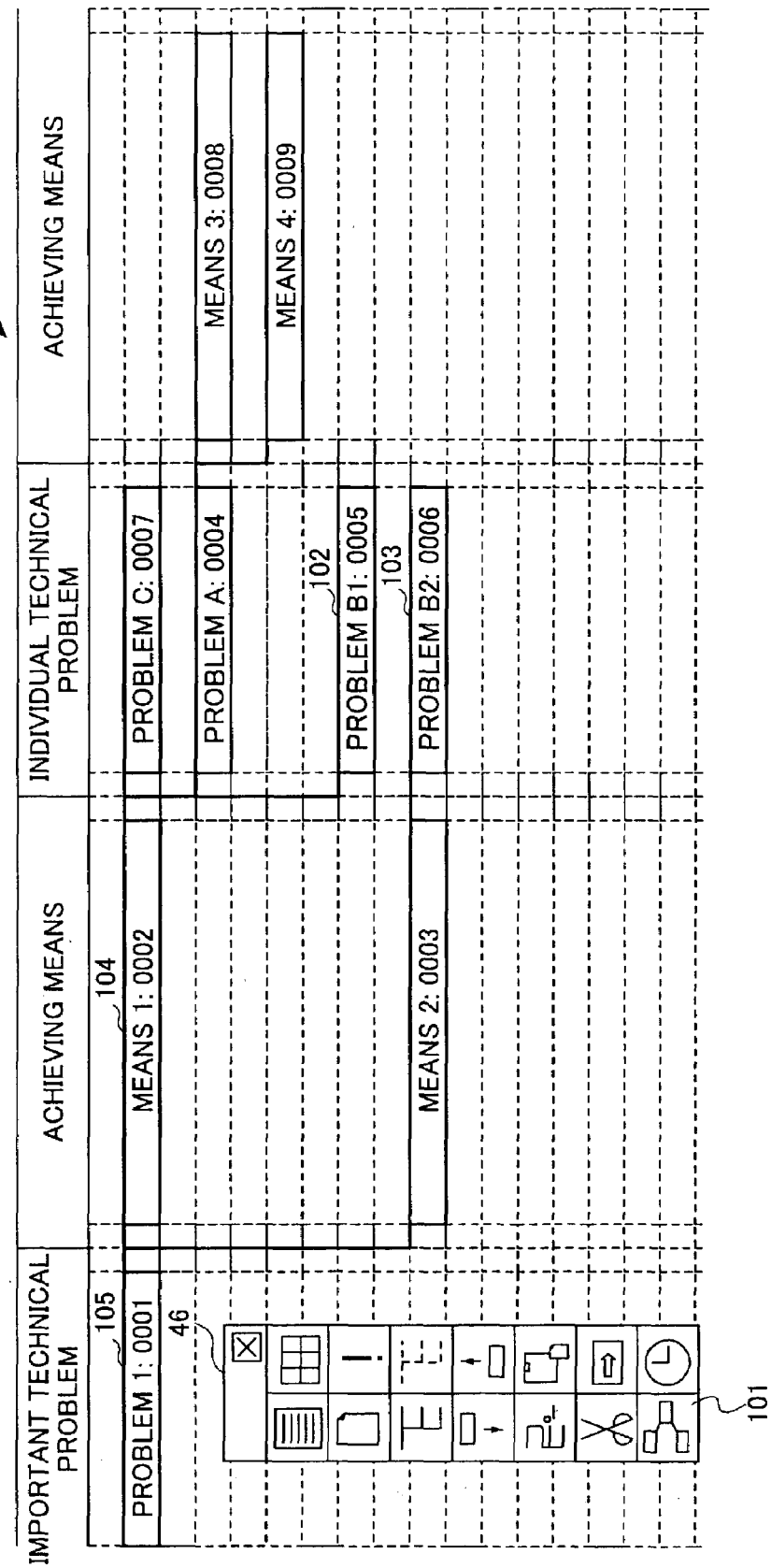
FIG. 13 is an explanatory diagram of the tree system diagram for explaining an extraction process of a part of objects according to a second embodiment.
Figure 14:
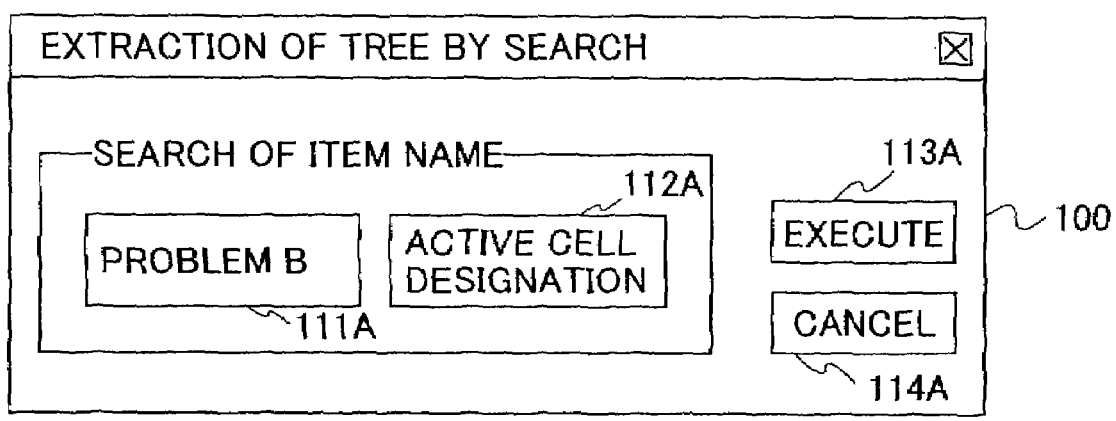
FIG. 14 is an explanatory diagram of a search window.
Figure 17:
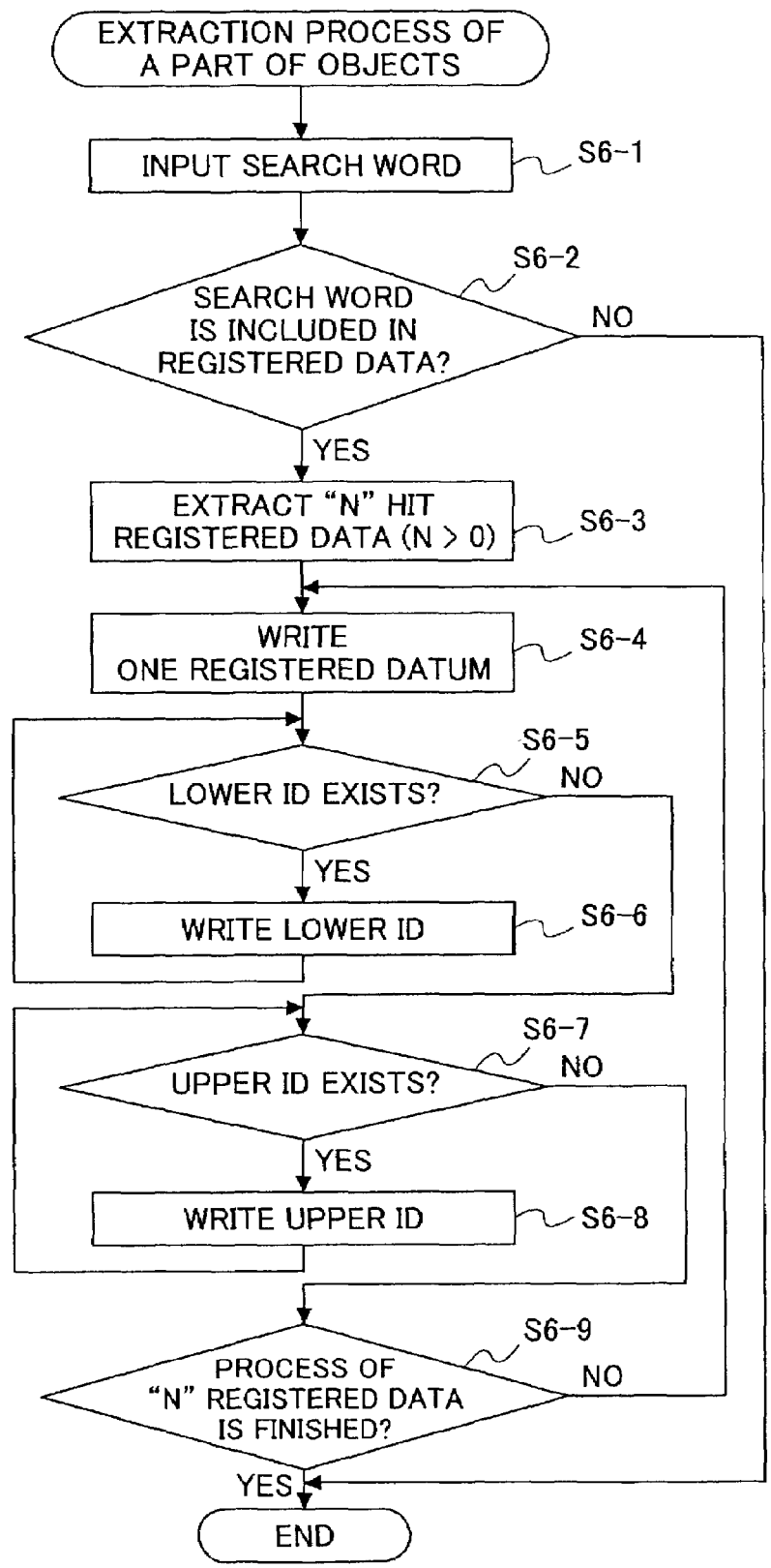
FIG. 17 is a flow chart for explaining the procedure of the extraction process of a part of the objects.

FIG. 13 shows a worksheet displaying a tree system diagram 100. FIG. 14 shows a search window 110 that is input with the search word and instructs searching. FIG. 15 shows a partially extracted tree system diagram 130 representing search result of the search made by inputting the search word to the search window 110. FIG. 16 shows a table used in searching. FIG. 17 shows the procedure of the extraction process of a part of the objects.

In a state where the worksheet displaying the tree system diagram 100 as shown in FIG. 13 is displayed, when a tree extraction button 101 of the operation panel 46 is clicked, the search window 110 as shown in FIG. 14 is displayed. As shown in FIG. 14, the search window 110 includes a search word input box 11A, an active cell designation button 112A, an execute button 113A and a cancel button 114A. The active cell designation button 112A is a button with which the user designates an active cell.

As shown in FIG. 17, in the extraction process of a part of the objects, first, in step S6-1, a search word is input. That is, the user inputs the search word in the search word input box 111A and clicks the execute button 113A. Here, "problem b" is input to the search word input box 111A and the execute button 113A is clicked.

Next, in step S6-2, the processor 22 determines whether or not the input search word is included in registered data.

In other words, the processor 22 determines whether or not an object including the word "problem b" exists by searching the object storing part 35. When the search word is not included in the registered data (NO in step S6-2), the processor 22 ends the process. When the search word is included in the registered data (YES in step S6-2), in step S6-3, the processor 22 extracts all registered data sets (n>0) that hit. That is, the processor 22 extracts the object information set 350 including the word "problem b" in the object name as the character information. Here, objects 102 and 103 are targets of the extraction that are displayed as "problem b1:0005" and "problem b2:0006", respectively.

Next, in step S6-4, the processor 22 writes one of the extracted registered data sets in the main memory 23. In other words, the processor 22 sets the object name, the ID, the column on the worksheet displaying the tree system diagram 100, and the like of the extracted object information set 350 to an item field, an ID field, a column field, an upper ID field, a number of lower IDs field, a lower ID 1 field, a lower ID 2 field and the like of a table 130 on another worksheet allocated to the main memory 23. Here, "problem b1" is set to the item field, "5" is set to the ID field, "7" representing that the object exists in the seventh column is set to the column field, "2" is set to the upper ID field, and "0" is set to the number of lower ID field. Then, based on the values set to the item field, the ID field and the column field, the processor 22 writes the object on a worksheet displaying the search result allocated to the main memory 23. Here, as shown in FIG. 15, the object "problem b1:0005" is written.

Next, in step S6-5, the processor 22 determines whether or not the lower ID is set to the property of the object. When the lower ID is set (YES in step S6-5), in step S6-6, the processor 22 writes the lower ID. In other words, based on the lower ID set to the table 130, the processor 22 searches the object information set 350 of the corresponding object. When searching the object of the lower ID, based on the column that is set to the column field of the table 130 and where the object exists, the search is made by specifying the column where the searching lower object exists. For example, the search of the lower object with respect to the object in the seventh column is made by targeting the objects set in the tenth column. Then, the processor 22 writes the searched object on the worksheet as shown in FIG. 15 displaying the search result. In addition, when the lower ID is set in the object information set 350 of the searched object, the processor 22 further writes the lower ID. In this manner, the process of writing the lower ID is repeated until the lowest object in the tree system diagram 100. It should be noted that, here, as shown in FIG. 13, the object "problem b1:0005" does not have the lower object (the lower ID is not set).

When the lower ID is not set, or when the writing process to the table 130 is finished with respect to all of the set lower IDs (NO in step S6-5), in step S6-7, the processor 22 determines whether or not the upper ID is set in the property of the object. When there is an upper ID (YES in step S6-7), in step S6-8, the processor 22 writes the set upper ID. That is, based on the upper ID set in the table 130, the processor 22 searches the object information set 350 of the corresponding object. When searching the object of the upper ID, based on the column that is set in the column field of the table 130 and where the object exists, the search is made by specifying the column where the searching upper object exists. For example, the search of the upper object with respect to the object in the seventh column is made by targeting the objects set in the fourth column. Then, the processor 22 writes the searched object on the worksheet as shown in FIG. 15 displaying the search result.

Here, as shown in FIG. 13, an object 104 "means 1:0002" is set to the object "problem b1:0005" as the upper object ("0002" is set as the upper ID). Hence, an object 133 "means 1:0002" is written in the worksheet shown in FIG. 15, and the correlation with an object 131 "problem b1:0005" is represented by a ruled line.

Then, when the upper ID is set in the object information set 350 of the searched object, the processor 22 further writes the upper ID. Here, an object 105 "problem 1:0001" is set to the object 104 "means 1:0002" as the upper object ("0001" is set as the upper ID). Hence, an object 133 "problem 1:0001" is written in the worksheet shown in FIG. 15, and the correlation with the object 132 "means 1:0002" is represented by a ruled line. In this manner, the process of writing the upper ID is repeated until the highest object of the tree system diagram 100.

Then, when the processor 22 has not finished the process of the "n" hit registered data (NO in step S6-9), the process from step S6-4 through step S6-8 is performed on the next registered datum (set). Here, a similar process is performed on the object 103 "problem b2:0006". Then, when the process of the "n" registered data sets is finished (YES in step S6-9), the processor 22 ends the process.

By the above-described process, the worksheet displaying the partially extracted tree system diagram 130 as shown in FIG. 15 is displayed.

According to the second embodiment, the following effects can be obtained.

In the second embodiment, the object name is stored in the object storing part 35, and the ID corresponding to the object name including the character information that agrees with the input search word is extracted. Hence, the object can be extracted by searching the object name according to the input search word.

Additionally, in the second embodiment, the object correlated with the object that has the object name including the character information that agrees with the input search word is extracted. Further, the process of extracting the correlated object is repeated, and the tree system diagram is output. Hence, it is possible to make a partially extracted display of the tree system diagram, with which it is possible to follow the objects correlated with the object having the object name that includes the input search word.

Further, in the second embodiment, column location information is stored in the object storing part 35, and when searching the object corresponding to the upper ID or the lower ID, the search is made by specifying the column. Hence, it is possible to improve the efficiency of the search.

In addition, the second embodiment may be modified as described below.

In the second embodiment, the search according to the input search word is performed on the object name. However, the search may be performed on other attribute information. For example, when there is a caption or the like as other attribute information, the search may be made on the caption.

Also, in the second embodiment, the search of the object name according to the input search word is made by targeting the object names stored in the object storing part 35. However, the search may be also made for the object names on the worksheet as document information.

In addition, in the second embodiment, when there are the plurality of objects selected according to the input search word, and the same object ("problem 1:0001") is extracted as the upper object correlated with the plurality of objects, the same object is plurally displayed as the search result. However, when the same object is extracted multiple times, the same object extracted multiple times may be displayed only once, by forming the tree system diagram that is output as the search result. Hence, it is possible to make partially extracted display of the tree system diagram more simply.

Additionally, in the second embodiment, no process is specially provided for a case where there are the plurality of objects selected according to the input search word and the partially extracted displays of the tree system diagrams of the objects correlated with the selected objects are the same. Thus, in the second embodiment, there is a case where the partially extracted displays of the similar tree system diagrams are plurally displayed as the search result. However, when the objects that make the partially extracted displays of the similar tree system diagrams are plurally selected, a single display may be made as the search result. Hence, it is possible to make the partially extracted display of the tree system diagram more simply.

Further, in the second embodiment, the partially extracted tree system diagram 130 representing the search result is displayed on the worksheet of the spreadsheet software. However, the partially extracted tree system diagram 130 may be displayed by other software that does not have a table including rows and columns.

Third Embodiment

A description will be given of a link setting process according to the third embodiment of the present invention, by referring to FIGS. 18 through 21. Here, a link between the object and information (external information) stored in the external database is set, and the external information is accessed based on the link setting. In this embodiment, the object is linked to, as the external information, patent information files registered in the database of the patent information search system, other related files, and documents of a groupware system (for example, Notes). It should be noted that the external database is connected to the computer system 20 via the LAN 31.

A description will be given of the link setting between the object and each of the patent information files, the other related files, and the documents of the groupware system. It should be noted that the processor 22 carries out the process according to a link setting program.

First, the link setting between the object and the patent information files is explained.

Here, in a patent information search window (not shown) displayed on the display 26, the user inputs a search request of patent information and searches for the patent information using the patent information search system. Accordingly, the patent information is extracted as the search result, and based on the extracted patent information, the following process is performed.

Figure 18:
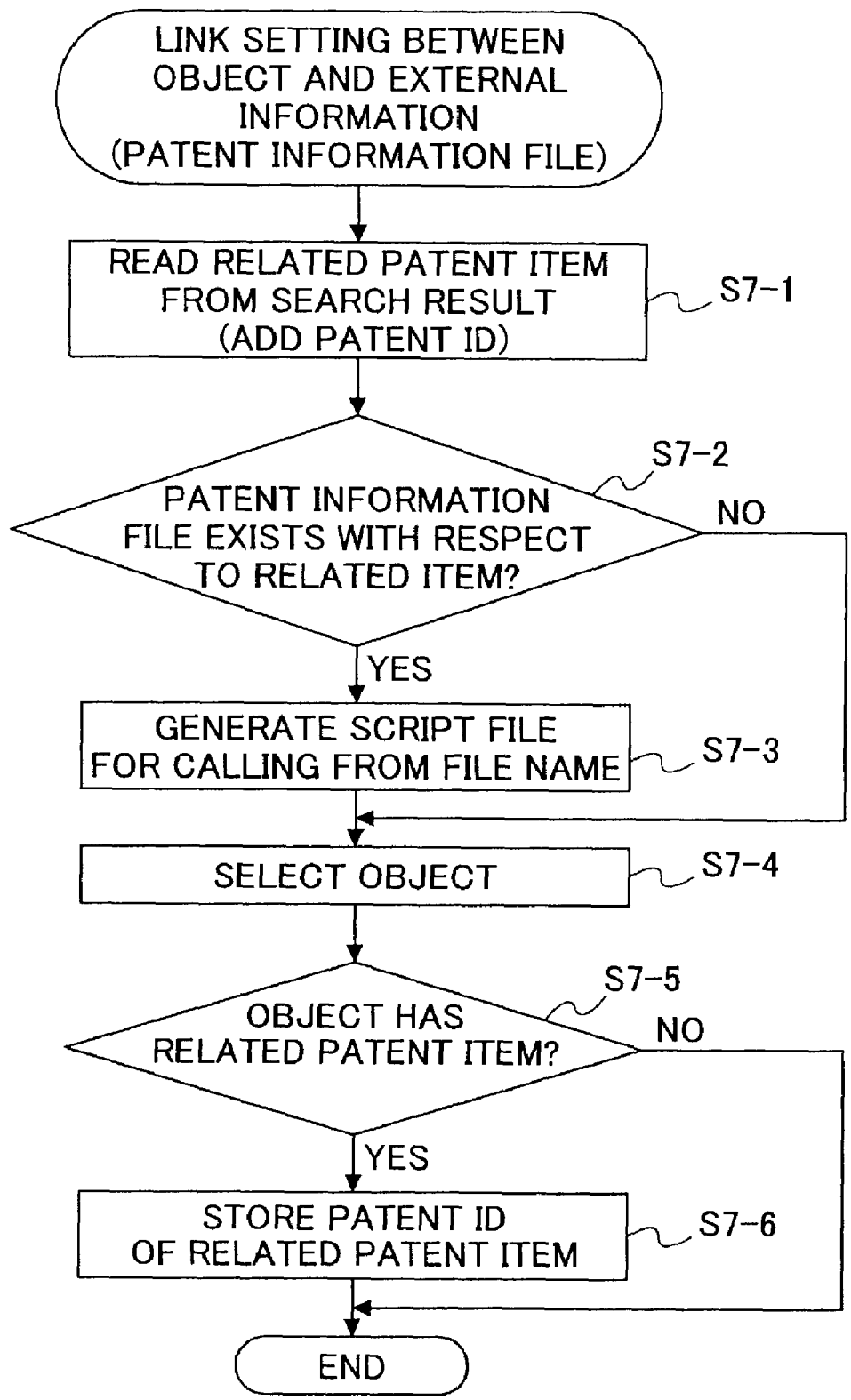
FIG. 18 is a flow chart for explaining the procedure of a link setting process according to a third embodiment.

As shown in FIG. 18, in step S7-1, the processor 22 reads the patent information extracted as the search result into the main memory 23 as a related patent item. At this moment, the processor 22 adds a patent ID to the related patent item. The patent ID is for identifying the related patent item.

Then, in step S7-2, it is determined whether or not a patent information file exists with respect to the related patent item. When the patent information file exists with respect to the related patent item (YES in step S7-2), in step S7-3, the processor 22 generates a script file for calling, from the file name of the patent information file. That is, the processor 22 generates the script file having a function for calling the patent information file. On the other hand, when the patent information file does not exist with respect to the related patent item (NO in step S7-2), the processor 22 does not generates the script file, and the process proceeds to step S7-4.

Next, in step S7-4, the user causes the display 26 to display the worksheet displaying the tree system diagram 40, selects the object on the worksheet, and requests for displaying the properties of the object. Hence, the display 26 displays the property setting window 50 as shown in FIG. 4 with respect to the selected object. Here, the read related patent item is displayed in the list selection part 89 such as "the patent ID, the patent type, the gazette number, the title of the invention" (for example, "001, [O], Japanese Laid-Open Patent Application No. 05-XXXXXX, semiconductor board").

Then, in step S7-5, it is determined whether or not the object has a related patent item. When the object has the related patent item (YES in step S7-5), in step S7-6, the patent ID of the related patent item is correlated with the object and stored, and the process ends. In other words, the user selects the related patent item in the list selection part 89, and clicks the link setting button 92. In response to this, the processor 22 causes the object storing part 35 to store the patent ID of the related patent item that is selected as the related patent information of the selected object. Then, the patent ID of the related patent item that is selected is displayed in the patent ID selection part 83. On the other hand, when the object does not have a related patent item (NO in step S7-5), the processor 22 ends the process.

Next, a description will be given of the link setting between the object and the related files other than the patent information files. Here, target files are, for example, files of Word, Excel, PowerPoint, Project and the like, PDF files, TIFF files, text files and the like.

Figure 19:
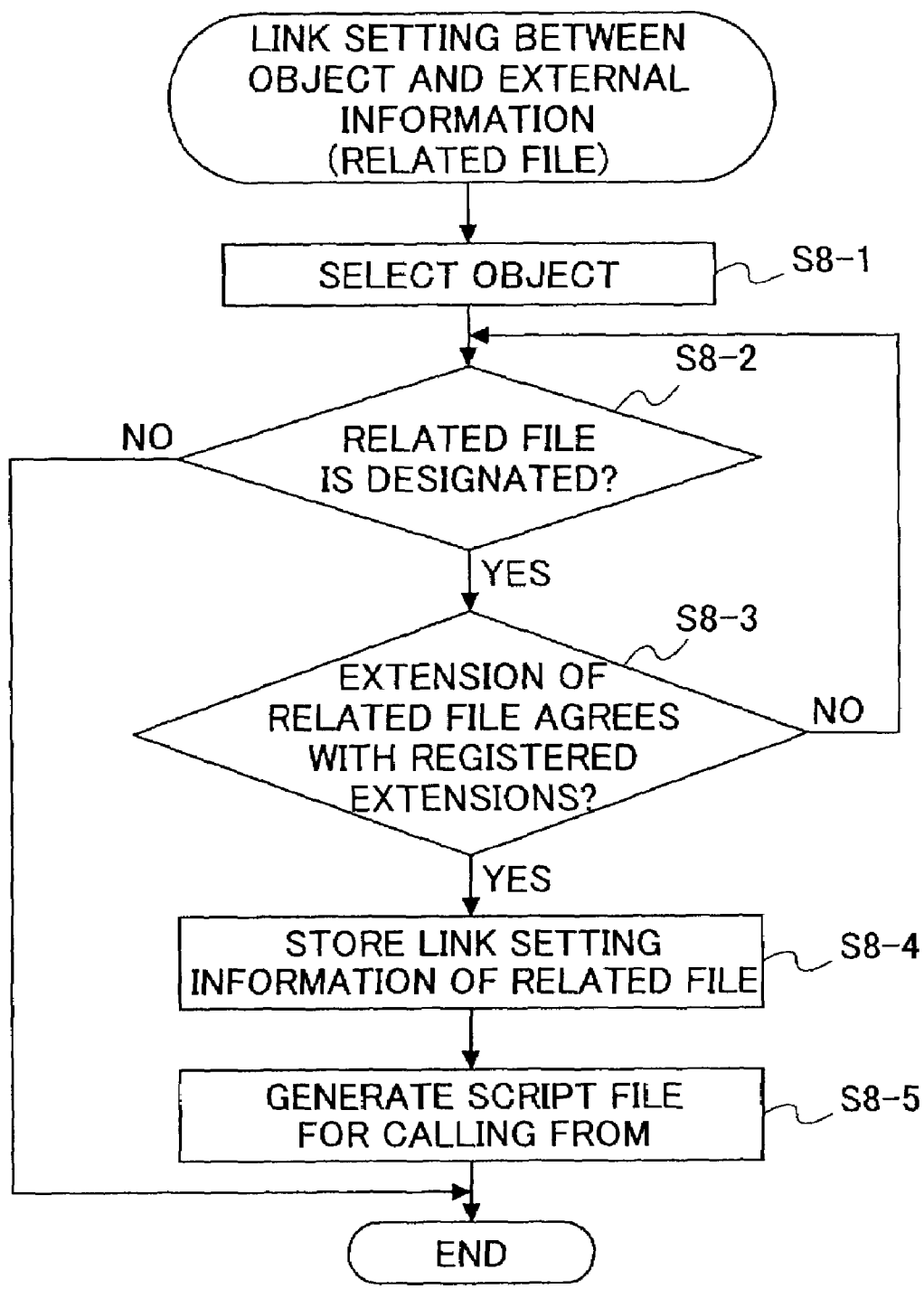
FIG. 19 is another flow chart for explaining the procedure of the link setting process.

As shown in FIG. 19, in step S8-1, the user causes the display 26 to display the worksheet displaying the tree system diagram 40, selects the object on the worksheet, and requests for the display of the object. Accordingly, the property setting window 50 as shown in FIG. 4 is displayed on the display 26, with respect to the selected object. Next, the user designates the related file. In other words, the user clicks the link setting button 92, causes the display 26 to display a related file designation window (not shown) in which the file in the external database is designated, and designates the related file in the related file designation window.

In step S8-2, it is determined whether or not the user designates the related file. When the user designates the related file (YES in step S8-2), in step S8-3, the processor 22 determines whether or not an extension of the related file that is designated agrees with registered extensions. Here, the registered extensions refer to extensions of the target files. When the extension of the related file does not agree with the registered extensions (NO in step S8-3), the processor 22 causes the display 26 to display the disagreement and the user designates the related file again. On the other hand, when the extension of the related file agrees with the registered extensions (YES in step S8-3), in step S8-4, the processor 22 causes the object storing part 35 to store the link setting information of the related file. That is, the processor 22 causes the object storing part 35 to store the link information designating the related file that is selected, as the link setting information of the selected object. In addition, based on the link setting information, the processor 22 causes the link file display part 91 to display the link information of the selected file.

Next, in step S8-5, the processor 22 generates the script file for calling, from the file name of the related file. More specifically, based on the file name of the related file, the processor 22 generates the script file having the function to call the related file. Further, when the user does not designate the related file (NO in step 8-2), the processor 22 ends the process.

Last, a description will be given of the link setting between the object and the database and documents of the groupware system.

Figure 20:
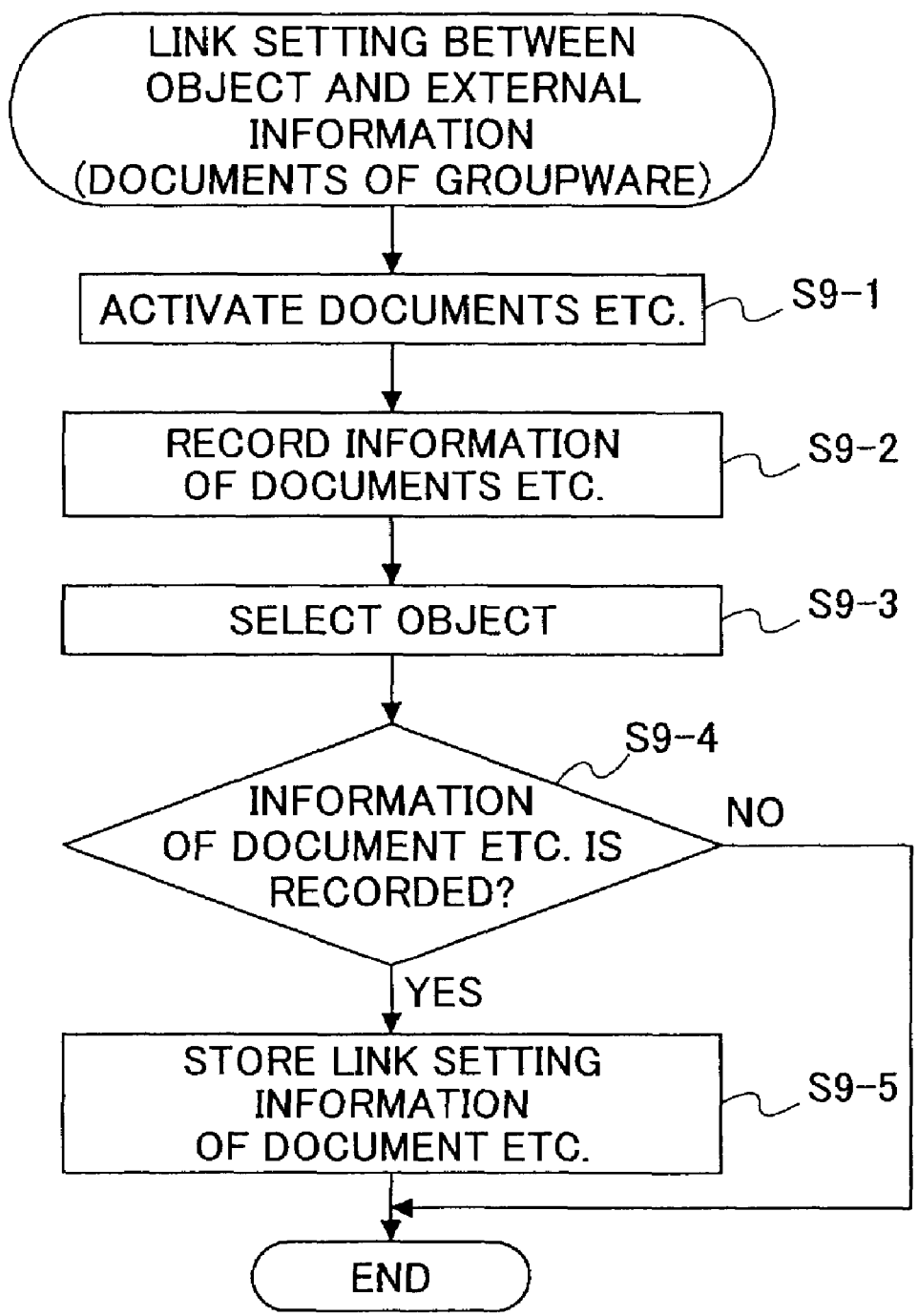
FIG. 20 is still another flow chart for explaining the procedure of the link setting process.

As shown in FIG. 20, first, in step S9-1, the database and documents of the groupware system are activated. That is, the user inputs an activation instruction of the database and documents of the groupware system, by the cursor control 28 or the like. Accordingly, the processor 22 transmits, to the groupware server, a request for activating the database and documents of the groupware system. Then, when the database and documents of the groupware system are activated, in step S9-2, the processor 22 reads information relating to the database and documents of the groupware system from the groupware server, and records the information in the main memory 23.

Next, in step S9-3, the user causes the display 26 to display the worksheet showing the tree system diagram 40, selects the object on the worksheet, and requests for displaying a link window (not shown) in which a link between the object and the database and documents of the groupware system is set as the property of the object. Thus, the link window is displayed on the display 26 with respect to the selected object. The link window includes a link document field, a management information field, a link set button, a link cancel button, and an activate button. The link document field displays designation of the database and management number of the document with respect to the document that is already set with the link. The management information field displays the designation of the database and the management number of the document with respect to the information that relates to the database and documents, and is recorded in the main memory 23. Here, when the user clicks the link set button, in step S9-4, the processor 22 determines whether or not the information of the database and document displayed in the management information field is recorded in the main memory 23.

When the information of the database and document is recorded in the main memory 23 (YES in step S9-4), the link setting information of the database and document are stored, and the process ends. More specifically, the processor 22 causes the object storing part 35 to store, as the link setting information, the designation of the database and the management number of the document. Then, the designation of the database and the management number of the document, which are set with the link, are displayed in the link document field of the link window. On the other hand, when the information of the database and document is not recorded in the main memory 23 (NO in step S9-4), the processor 22 ends the process.

Next, a description will be given of access to external information based on the link setting. It should be noted that the processor 22 reads the external information according to an external information reading program.

In FIG. 21, in step S10-1, the user causes the displays 26 to display the worksheet showing the tree system diagram 40, selects the object on the worksheet, and requests for displaying the properties of the object. Accordingly, the property setting window 50 as shown in FIG. 4 is displayed on the display 26 with respect to the selected object. In step S7-2, it is determined whether or not the object is linked to external information. When the object is not linked to external information (NO in step S10-2), the process ends. On the other hand, when the object is linked to external information (YES in step S10-2), in step S10-3, the user determines whether or not the linked external information is the patent information file, based on the display of the property setting window 50.

When the linked external information is the patent information file (YES in step S10-3), a script for calling the patent information file is activated in step S10-4, the patent information file is called and displayed on the display 26, and the process ends. That is, in the property setting window 50, the user selects the patent ID in the patent ID selection part 83 and clicks the patent search system start button 87. In response to this, the processor 22 activates the script for calling the patent information file selected according to the patent ID. Thus, the patent information file is called and displayed on the display 26. On the other hand, when the linked external information is not the patent information file (NO in step S10-3), in step S10-5, the processor 22 determines whether or not the linked external information is a document of the groupware system.

When the linked external information is not a document of the groupware system (NO in step S10-5), the name of the related file is changed to the script file name in step S10-6. Then, in step S10-7, the processor 22 activates the script, calls and displays the related file on the display 26, and ends the process. That is, in the property setting window 50, the user selects the related file in the link file display part 91, and clicks the link file activation button 94. In response to this, the processor 22 changes the file name of the related file that is selected to the script file name for calling the related file. Then, based on the script file name, the processor 22 specifies the script file for calling the related file and activates the script for calling the related file. Hence, the related file is called and displayed on the display 26.

On the other hand, when the linked external information is a document of the groupware system (YES in step S10-5), in step S10-8, a process for reading the document of the groupware system is started, by using the designation of the database and the management number as parameters. Then, the process ends by reading the document of the groupware system and displaying the document on the display 26. In other words, in the link window, the user selects the designation of the database and the management number of the document in the link document field, and clicks the activate button. In response to this, the processor 22 starts a process for calling the document, by taking the designation of the database and the management number of the document as parameters. Hence, the document of the groupware system is read and displayed on the display 26.

As described above, according to the third embodiment, the following effects can be obtained.

In the third embodiment, the ID of each object is correlated with the information stored in the external database. Hence, it is possible to correlate each object with the external database.

Also, in the third embodiment, with respect to the selected object, by operating the property setting window 50, the information that is stored in the external database and is correlated with the ID of the selected object is read. Hence, it is possible to read the information that is stored in the external database and that corresponds to the selected object by a simple operation.

In addition, in the third embodiment, based on the patent information searched by the patent information search system, the script file for calling the patent information file is generated, and the patent information file is called by activating the script. Hence, it is possible to display the content stored in the patent information file by a simple operation.

Additionally, in the third embodiment, files of Word and the like are set as the related files when the extensions thereof are the registered extensions. Therefore, it is possible to set only files of operative software as the related files when only the extensions of the operative software are registered with respect to the software of which operations are checked.

Further, in the third embodiment, with respect to the related files of Word and the like, the script file for calling is generated based on the file name of the related file. Then, when the activation of the related file is requested, by changing the file name of the related file to the file name of the script file so as to specify the script file for calling, the script is activated and the related file is called. Therefore, it is possible to display the content stored in the related file by a simple operation.

Moreover, in the third embodiment, the designation of the database and the management number of a document of a groupware system are stored, and the process for calling the document of the groupware system is started by taking the above-described designation and management number as the parameters. Accordingly, it is possible to display the document of the groupware system by a simple operation.

Furthermore, in the third embodiment, the external database is connected to the computer system 20 via the LAN 31. Thus, it is possible to read the information stored in the external database via the LAN 31.

Additionally, the third embodiment may be modified as described below.

In the third embodiment, as the information stored in the external database, the patent information files, the related files of Word and the like, and the documents of the groupware system are used. However, the above-described files and documents do not constitute limitations of the information that can be used as the information stored in the external database. For example, a file managed by another specific management system or the like may be used.

In addition, in the third embodiment, the external database is connected to the computer system 20 via the LAN 31. However, the external database may be connected to the computer system 20 via a dedicated line, a public line, the Internet, an intranet, or an extranet (wide-area network) instead of or besides the LAN 31.

Also, in the third embodiment, the information stored in the external database that is referred to is information accessed via the computer system 20 and the LAN 31. However, other information that is stored in the external storage device 25 may be referred to.

Furthermore, in the first through third embodiments, the tree system diagrams (for example, tree system diagrams 40, 100a, 100b, 120a and 120b) are displayed on the worksheets of the spreadsheet software. However, the tree system diagrams may be displayed by using another software system not having a table including rows and columns. In this case, instead of setting a property in the property setting window 50 by designating the cell, the property may be set similarly by selecting the location that displays the object. In addition, an arranging position of the object in the tree system diagram may be automatically set according to the correlation of the objects basing on the set upper ID and lower ID.

Moreover, in the first through third embodiments, the correlation of the problem-achieving means is represented by the tree system diagram. However, this is not a limitation of the relationship among the objects represented by the tree system diagram according to the present invention. Any target may be output as the tree system diagram according to the present invention, as long as the relationship among the objects can be represented by using the tree system diagram. The tree system diagram according to the present invention may be applied to function development, organization development, program processing, and organization charts, for example.

The present invention is not limited to the specifically disclosed embodiments, and variations and modifications may be made without departing from the scope of the present invention.

The present application is based on Japanese priority applications No. 2001-282410 filed on Sep. 17, 2001, No. 2001-282411 filed on Sep. 17, 2001, and No. 2001-282412 filed on Sep. 17, 2001, the entire contents of which are hereby incorporated by reference.

What is claimed is:

1. A method of using a computer for correlating a plurality of objects to form a tree system diagram, comprising the step of:

storing, in a first storing part of a memory, an identifier specific to each of the plurality of objects which objects are written on a first worksheet of a tree system diagram;

selecting by a user at least one object among the plurality of objects written on said first worksheet;

pasting the at least one object among the plurality of objects written on said first worksheet to a second worksheet by clicking a copy icon of an operation panel;

changing the identifier of the at least one object to be pasted to a second identifier from the identifier stored in said first storing part;

correlating the plurality of objects by specifying a hierarchical order of the plurality of objects using identifiers thereof, wherein the identifier once stored in the first storing part is left undeleted and is used for a next select object even if the at least one object to which the identifier is specific is deleted;

outputting the pasted at least one object in the second worksheet as a tree system diagram in which the pasted at least one object is correlated to the plurality of objects;

wherein the changing comprises the steps of:

storing, in a second storing part of the memory, the second identifier given to the at least one object on the second worksheet before the at least one object is pasted, and giving an identifier other than the second identifier stored in said second storing part to the at least one object pasted; and wherein the giving comprises the steps of:

counting a number of objects pasted to the second worksheet;

counting a number of identifiers stored in the second storing part;

giving an identifier obtained by incrementing an identifier stored in the second storing part if the number of objects counted agrees with the number of identifiers counted; and allocating a free identifier to an identifier of the pasted at least one object if the number of objects counted does not agree with the number of the identifiers counted.

2. A storage computer-readable medium storing a computer program for correlating a plurality of objects to form a tree system diagram, said computer program comprising instructions causing a computer to perform the steps of:

storing, in a first storing part of a memory, an identifier specific to each of the plurality of objects which objects are written on a first worksheet of a tree system diagram;

selecting by a user at least one object among the plurality of objects written on said first worksheet;

pasting the at least one object among the plurality of objects written on said first worksheet to a second worksheet by clicking a copy icon of an operation panel;

changing the identifier of the at least one object to be pasted to a second identifier from the identifier stored in said first storing part;

correlating the plurality of objects by specifying a hierarchical order of the plurality of objects using identifiers thereof, wherein the identifier once stored in the first storing part is left undeleted and is used for a next select object even if the at least one object to which the identifier is specific is deleted;

outputting the pasted at least one object in the second worksheet as a tree system diagram in which the pasted at least one object is correlated to the plurality of objects;

wherein the changing comprises the steps of:

storing, in a second storing part of the memory, the second identifier given to the at least one object on the second worksheet before the at least one object is pasted, and giving an identifier other than the second identifier stored in said second storing part to the at least one object pasted; and wherein the giving comprises the steps of:

counting a number of objects pasted to the second worksheet;

counting a number of identifiers stored in the second storing part;

giving an identifier obtained by incrementing an identifier stored in the second storing part if the number of objects counted agrees with the number of identifiers counted; and allocating a free identifier to an identifier of the pasted at least one object if the number of objects counted does not agree with the number of the identifiers counted.

3. A storage computer-readable medium storing a computer program for correlating a plurality of objects to form a tree system diagram, said computer program comprising instructions causing a computer to perform the steps of:

storing, in a first storing part of a memory, an identifier specific to each of the plurality of objects which objects are written on a first worksheet of a tree system diagram;

selecting by a user at least one object among the plurality of objects written on said first worksheet;

pasting the at least one object among the plurality of objects written on said first worksheet to a second worksheet by clicking a copy icon of an operation panel;

changing the identifier of the at least one object to be pasted to a second identifier from the identifier stored in said first storing part;

correlating the plurality of objects by specifying a hierarchical order of the plurality of objects using identifiers thereof, wherein the identifier once stored in the first storing part is left undeleted and is used for a next select object even if the at least one object to which the identifier is specific is deleted;

outputting the pasted at least one object in the second worksheet as a tree system diagram in which the pasted at least one object is correlated to the plurality of objects;

wherein the changing comprises the step of:

giving an identifier other than the second identifier stored in a second storing part to the at least one object pasted; and wherein the giving comprises the steps of:

counting a number of objects pasted to the second worksheet;

counting a number of identifiers stored in the second storing part;

giving an identifier obtained by incrementing an identifier stored in the second storing part if the number of objects counted agrees with the number of identifiers counted; and allocating a free identifier to an identifier of the pasted at least one object if the number of objects counted does not agree with the number of the identifiers counted.

* * * * *